(12) United States Patent
Ponsart et al.

(10) Patent No.: US 8,100,363 B2
(45) Date of Patent: Jan. 24, 2012

(54) HATCH EQUIPPED WITH AT LEAST ONE LOCKING SOCKET CAPABLE OF BEING ACTUATED ON EACH SIDE OF THE HATCH

(75) Inventors: Jaouen Ponsart, Blagnac (FR); Jerome Gras, Castelnau d'Estretefonds (FR)

(73) Assignee: Airbus Operations SAS, Toulouse (FR)

( * ) Notice: Subject to any disclaimer, the term of this patent is extended or adjusted under 35 U.S.C. 154(b) by 839 days.

(21) Appl. No.: 12/145,040

(22) Filed: Jun. 24, 2008

(65) Prior Publication Data

US 2009/0014590 A1    Jan. 15, 2009

(30) Foreign Application Priority Data

Jul. 9, 2007 (FR) .................................... 07 56351

(51) Int. Cl.
*B64C 1/14* (2006.01)

(52) U.S. Cl. .................... 244/129.4; 244/129.5; 49/394; 49/395; 292/336.3; 292/166; 292/170

(58) Field of Classification Search .............. 244/129.4, 244/129.5; 49/394, 395; 292/336.3, 166, 292/170, 200
See application file for complete search history.

(56) References Cited

U.S. PATENT DOCUMENTS

| | | | | |
|---|---|---|---|---|
| 3,606,700 A | * | 9/1971 | Davis | 49/394 |
| 3,737,184 A | * | 6/1973 | Swartz | 292/170 |
| 3,909,051 A | * | 9/1975 | Nakai | 292/166 |
| 4,707,006 A | * | 11/1987 | Garg et al. | 292/336.3 |
| 4,892,338 A | * | 1/1990 | Weinerman et al. | 292/35 |
| 5,556,145 A | * | 9/1996 | Takasaki | 292/336.3 |
| 5,878,606 A | * | 3/1999 | Chaput et al. | 70/108 |
| 5,909,921 A | * | 6/1999 | Nesbeth | 296/100.1 |
| 6,006,560 A | * | 12/1999 | DeVries | 70/208 |
| 6,009,932 A | * | 1/2000 | Smith | 160/371 |
| 6,309,008 B1 | * | 10/2001 | Bacon | 296/106 |
| 6,691,953 B2 | * | 2/2004 | Leclerc | 244/129.5 |
| 7,261,328 B2 | * | 8/2007 | Minix | 292/28 |
| 2003/0047951 A1 | * | 3/2003 | Belchine et al. | 292/336.3 |
| 2006/0048449 A1 | | 3/2006 | Roques et al. | |
| 2007/0151163 A1 | * | 7/2007 | Thielmann et al. | 49/395 |
| 2008/0006069 A1 | * | 1/2008 | Liao | 70/413 |

FOREIGN PATENT DOCUMENTS

| | | |
|---|---|---|
| FR | 2 778 854 | 11/1999 |
| FR | 2 887 281 | 12/2006 |

* cited by examiner

*Primary Examiner* — Tien Dinh
*Assistant Examiner* — Justin Benedik
(74) *Attorney, Agent, or Firm* — Oblon, Spivak, McClelland, Maier & Neustadt, L.L.P.

(57) ABSTRACT

A hatch provided with at least one locking socket, equipped with a first actuator to urge a flexible linear pulling member, connected to the socket, in an unlocking direction, by abutting against a stop member secured to the member, at a distance from a second member end of the member, in which the actuator can be controlled from a first side of the hatch, and equipped with second actuator to urge the member in the unlocking direction, the second actuator being connected to the second end and being controllable from a second side of the hatch.

11 Claims, 17 Drawing Sheets

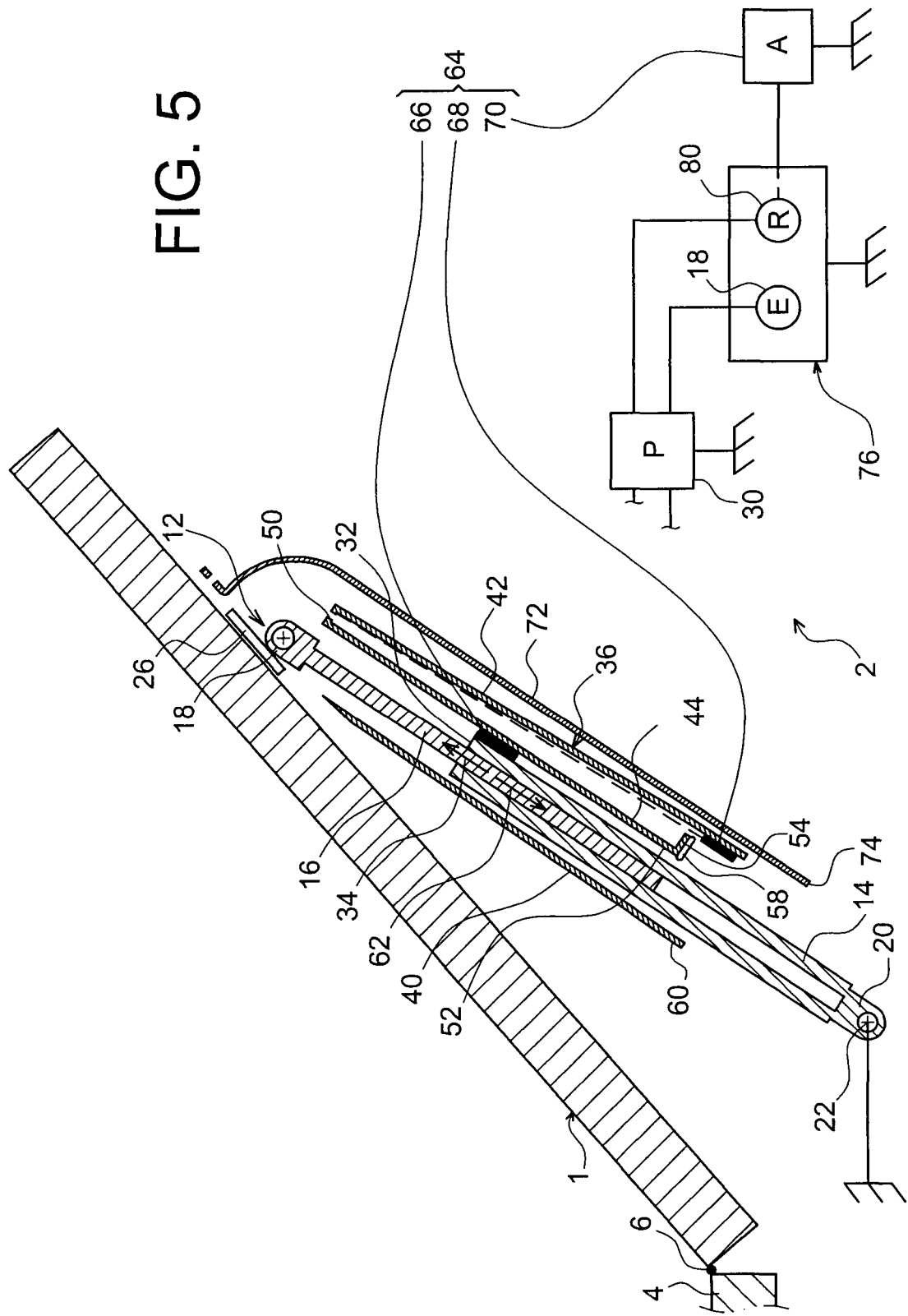

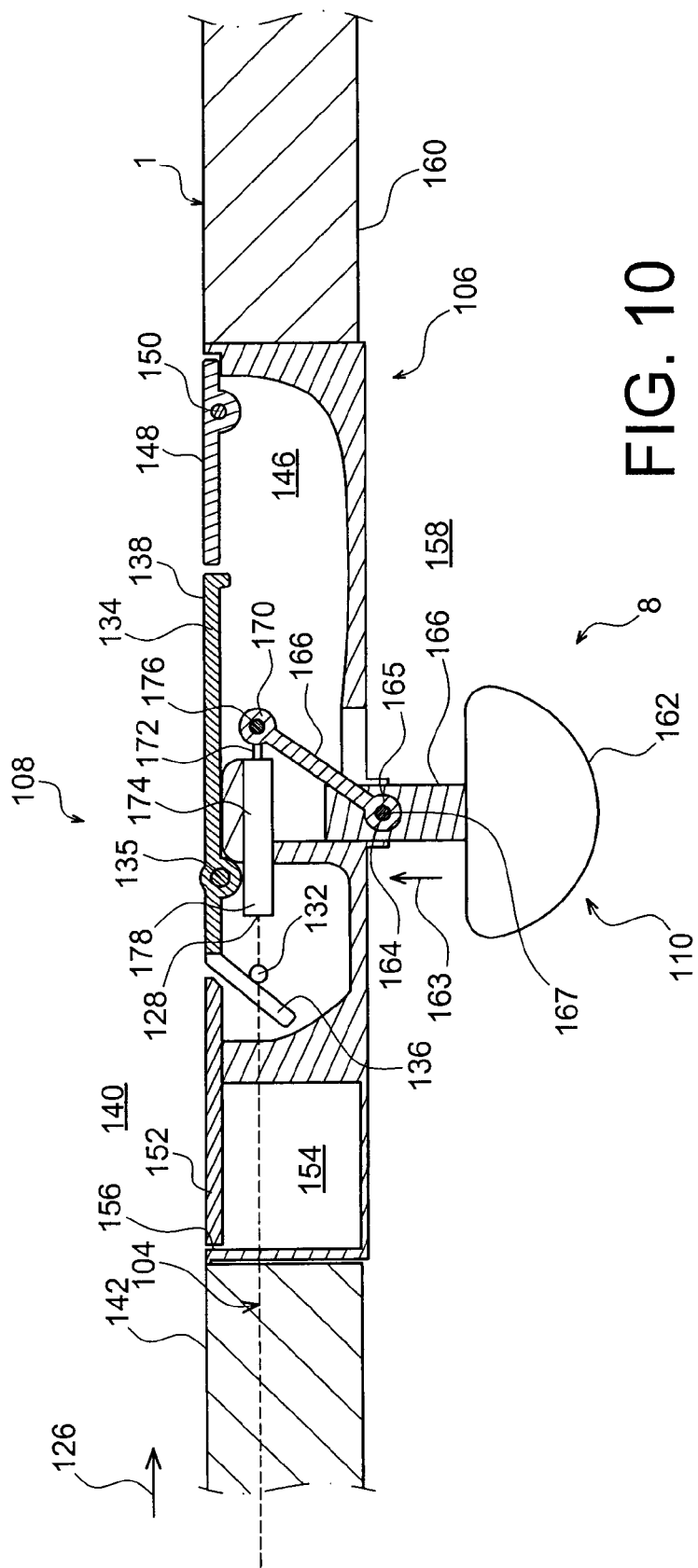

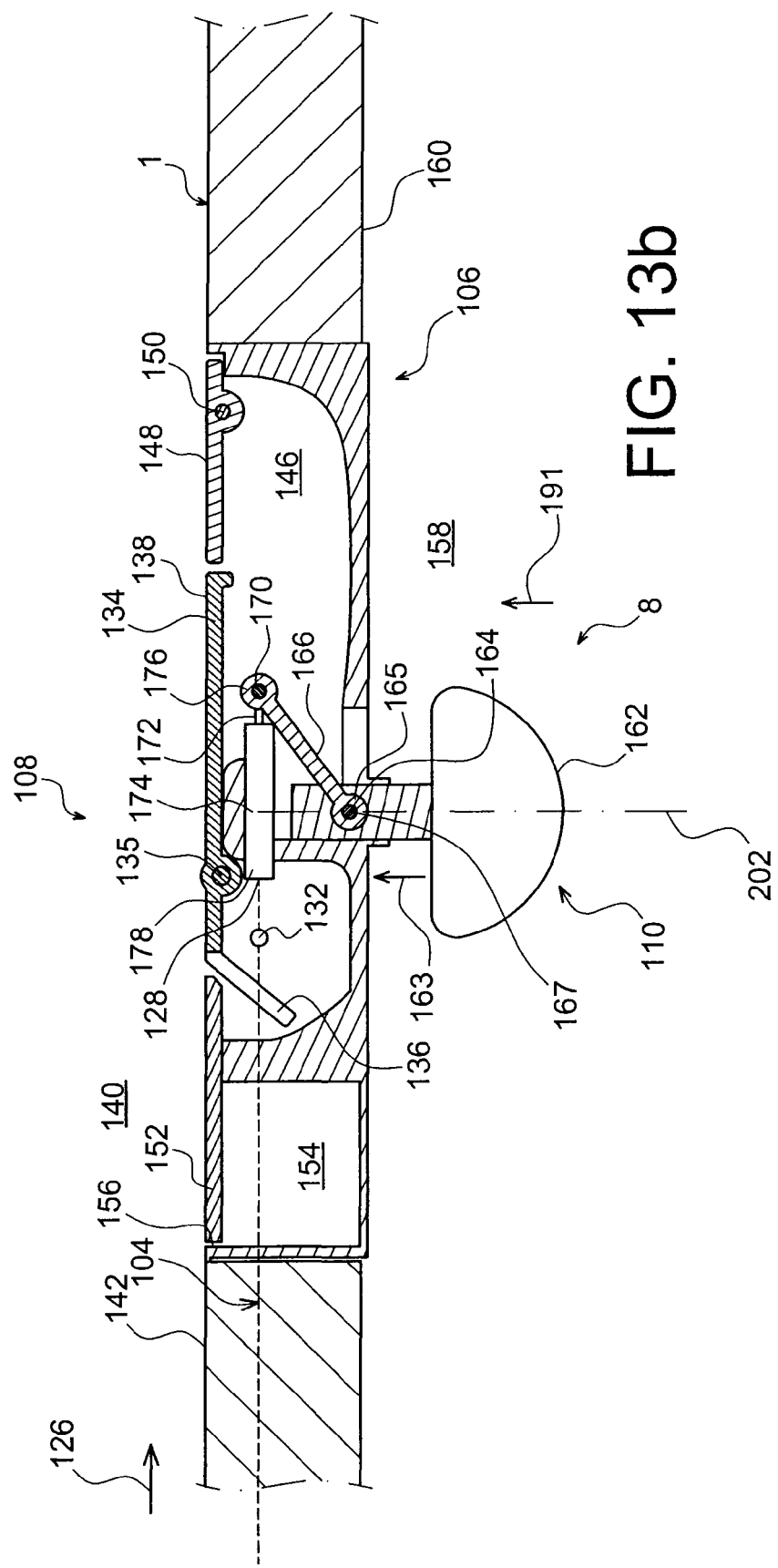

HATCH EQUIPPED WITH AT LEAST ONE LOCKING SOCKET CAPABLE OF BEING ACTUATED ON EACH SIDE OF THE HATCH

This invention relates in general to the field of hatches equipped with at least one locking socket capable of being actuated on each of the two sides of said hatch, and in particular those used on aircrafts.

Thus, the invention is particularly but not exclusively suitable for use on large commercial aircraft carriers and very large carriers.

It can relate to a hinged hatch designed to enable occupants to move from one space to another in said aircraft, when it is in the open position. For example, it can be a hatch arranged on a floor of the aircraft, such as the cockpit floor separating an upper cockpit area from a lower resting area for the crew, also called "FCRC" ("Flight Crew Rest Compartment"). By way of indication, such a hatch is known from document FR 2 887 281.

Means for actuating the locking sockets are generally provided on each side of the hatch, so that it can be unlocked by an operator located in either one of the two spaces separated by the hatch. This duality of the actuation means normally results in a heavy and costly design for the hatch, in particular when independence is sought between the various actuation means, namely a design making it possible to control the actuation means located on one of the sides of the hatch without creating a movement of the actuation means located on the other side of said hatch, and vice versa.

Therefore, there is a need to optimize the design of this type of hatch.

To satisfy this need, the invention relates to a hatch equipped with at least one locking socket for said hatch, which locking socket is slidingly mounted and capable of occupying an extracted locking position as well as a retracted unlocking position. According to the invention, it includes at least one flexible linear pulling member for said socket of which a first member end is secured to said unlocking socket, and said member makes it possible, when it is urged in an unlocking direction, to move said locking socket from said extracted locking position to said retracted unlocking position, and said hatch is equipped first actuation means making it possible to urge said flexible linear pulling member in the unlocking direction, by abutting against a stop member secured to said flexible linear pulling member, at a distance from a second member end opposite said first member end, and said first actuation means can be controlled from a first side of said hatch, and also equipped with second actuation means making it possible to urge said flexible linear pulling member in the unlocking direction, in which said second actuation means are connected to said second member end, and said second actuation means can be controlled from a second side of said hatch, opposite said first side.

One of the special features of the present invention therefore lies in the provision of a flexible linear pulling member for said socket, of the flexible cable, chain, rope, etc., type, provided so as to cooperate with each of the first and second actuation means of the locking socket. This special feature advantageously simplifies the design of the hatch.

In addition, the flexibility of the linear pulling member advantageously makes it possible to obtain independence between the first and second actuation means. Indeed, when controlling the first actuation means, the stop member secured to the linear pulling member is moved by abutment in the unlocking direction toward the second member end, which remains stationary, with the portion of the linear pulling member located between the second end and the stop member becoming increasingly relaxed owing to its flexibility, and most importantly enabling no movement to be transmitted to the second actuation means directly connected to the second end. In addition, when controlling the second actuation means, the second end of the linear pulling member is moved in the unlocking direction by driving, with it, the stop member, which moves away from the first actuation means without generating any movement of the latter.

More generally, the invention ensures independence between the first and second actuation means, in the sense that the design chosen makes it possible to control the first actuation means located on the first side of the hatch without creating a movement of the second actuation means located on the second side of said hatch, and vice versa. This advantage is extremely relevant when the first external surface of the hatch located on said first side is intended to constitute a walking surface for the occupants of the aircraft. Indeed, a movement of the first actuation means resulting from a control of the second actuation means by an occupant located under the hatch could become an obstruction for another occupant walking on said same hatch, an obstruction over which said other occupant could, for example, trip.

Preferably, said first actuation means include a pivoting lever of which a so-called contact end is capable of abutting against said stop member secured to said flexible linear member, and of which another so-called gripping end is accessible from said first side of said hatch. In such a case, said first actuation means are preferably designed so that the urging of said flexible linear pulling member, by rotating said pivoting lever, is obtained by moving said gripping end away from a first external surface of the hatch, located on said first side of it. In addition, preferably, in a resting position, said pivoting lever is flush with said first external surface of the hatch. More specifically, in this resting position, the external surface of the pivoting lever can be considered to be at least partially located substantially in the same plane as the first external surface, which external lever surface preferably does not project outwardly from said first surface. This thus advantageously makes it possible not to form an obstruction for an occupant walking on said first external surface of the hatch.

Preferably, the hatch includes an internal space for access to said gripping end of said pivoting lever, which internal access space is closed by a hinged cover flush with said first external surface of the hatch and said pivoting lever. Again, in a resting position of the cover, it can be considered that its external surface is at least partially located substantially in the same plane as the first external surface, which external cover surface preferably does not project outwardly from said first surface. Even more preferably, a cutout formed in the first external surface of the hatch for housing the first actuation means is substantially entirely filled by portions of external surfaces of the components of these first means, arranged in the plane of said first external surface.

Preferably, said second actuation means include:
- an actuation push button accessible from said second side of said hatch;
- a connecting link pivotably connected at one of its ends to a piston of said actuation push button; and
- a sliding member pivotably connected at one of its ends to the other of the ends of the connecting link, and connected at its other end to said flexible linear pulling member for said socket, in which said second actuation means are designed so that a pressure on said push button causes a movement of said sliding member in said unlocking direction.

Also preferably, the hatch includes a plurality of locking sockets arranged so as to be capable of being moved simultaneously from said extracted locking position to said retracted unlocking position, when any one of the first and second actuation means is actuated. It is thus noted that each socket can be equipped with its own flexible linear pulling member, of which the second end of each is then connected to the second actuation means.

Preferably, each locking socket is also equipped with a main actuation system enabling its movement from said extracted locking position to said retracted unlocking position, with said first and second actuation means forming an emergency device. In such a case, said main actuation system is preferably an electromagnetic system. In this way, when the main actuation system breaks down, for example due to a power failure, the first and second actuation means can be controlled without any concern by the occupant wanting to unlock the hatch, insofar as these actuation means are exclusively mechanical.

Naturally, it is also possible for the first and second actuation means to constitute the main locking/unlocking system of the hatch, without going beyond the scope of the invention.

Preferably, each locking socket is also equipped with resilient return means forcing it to return to its extracted locking position.

In addition, it is possible for each locking socket to be equipped at one end with a roller, making it possible in particular to facilitate its rolling on an inclined ramp when the hatch is closed, resulting in the retraction of the socket concerned in its unlocking position.

Preferably, the hatch is equipped with a system for opening/closing it. This cylinder system preferably makes it possible to obtain a secure and reliable locking of the piston resting in the extracted position, also called the up position, so as to prevent involuntary pressure exerted on the cylinder element from accidentally causing a retraction of the piston into its associated cylinder.

Preferably, the cylinder system includes a cylinder element provided with a cylinder into which a piston, with an external end, slides, which cylinder is equipped with first stop means. The system also includes:

a body arranged around said cylinder element and pivotably mounted on said external end of the piston, according to a pivot axis, which body comprises second stop means and is capable of occupying, with respect to the cylinder element and according to the pivot axis, a first angular position allowing an extraction/retraction of the piston with respect to the cylinder, as well as a second angular position allowed only when the piston occupies, with respect to the cylinder, an extracted position so that said second stop means are located beyond said first stop means in a direction of extraction of the piston with respect to the cylinder, and the body occupies said second position ensuring the positioning, in the direction of extraction, opposite the first and second stop means; and an electromagnetic attraction/repulsion device including a first element securely mounted on said cylinder as well as a second element securely mounted on said body, which device is designed to ensure the movement of the body from said first position to said second position, and vice versa, by attraction/repulsion of said first and second elements.

It should thus be understood that, in the second angular position, also called the locking position of the piston, the arrangement opposite the first and second stop means makes it possible to provide a secure and reliable locking of the piston in the extracted position. Indeed, in the first case, in which the arrangement opposite takes the form of a contact of said two stop means, the piston is then held in its extracted position even in the event of an involuntary pressure exerted on the cylinder element, owing to the stop provided by the aforementioned contact. In the other case, in which the stop means are arranged opposite but at a small distance from one another, which case is preferred in order to facilitate the subsequent return to the first position, the possible retraction of the piston into the cylinder, capable of occurring as a result of an involuntary pressure exerted on the cylinder element, will be limited by the contact between the first and second stop means previously arranged opposite one another.

Consequently, the cylinder system proposed advantageously makes it possible to provide a secure and reliable locking of the piston resting in the extracted position/up position, while having a simple and inexpensive design.

As indicated above, the movements from the first angular position to the second angular position, and vice versa, which cannot take place unless the piston occupies, with respect to the cylinder, an extracted position so that the second stop means are located beyond the first stop means in a direction of extraction of the piston, are cleverly achieved with an electromagnetic attraction/repulsion device.

It is thus indicated that the device can be designed so that one of the two aforementioned movements takes place only by a magnetic attraction force between a permanent magnet and a magnetic body. This means that the movement from one to the other of the two angular positions of the body can be obtained automatically under the simple effect of magnetic attraction observed between the two aforementioned elements, which advantageously does not require any electrical power supply of the device. In this preferred case in which one of the two movements of the body is achieved by the simple effect of magnetic attraction between the permanent magnet ant the magnetic body, and in which the other movement is achieved by way of consequence by electromagnetic repulsion of the permanent magnet and the magnetic body electrically powered in the appropriate manner, making it possible to generate a magnetic field ensuring the repulsion, it is preferable for security reasons to design the cylinder system so that the simple magnetic attraction ensures the change from the first angular position, called the unlocking position, to the second angular position, called the locking position.

Nevertheless, it is noted that the electromagnetic attraction/repulsion device could alternatively include two magnetic bodies each capable of being electrically powered in a way enabling them to jointly and alternatively ensure their electromagnetic attraction and repulsion, without going beyond the scope of the invention.

Preferably, and as mentioned above, said first and second elements of said electromagnetic attraction/repulsion device are respectively a permanent magnet and a magnetic body capable of being electrically powered by an electrical power supply belonging to said device, or vice versa. By way of indication, the aforementioned electrical power supply can also be used to provide the electrical energy needed for the operation of the main actuation system of the unlocking sockets, in particular when it is an electromagnetic system.

Preferably, the device is designed so as to automatically ensure the movement of the body from said first position to said second position, by magnetic attraction of the first element and the second element not electrically powered by said electrical power supply. Naturally, this magnetic attraction occurs automatically, without intervention of the operator, when the piston is sufficiently extracted from the cylinder in order to place its magnetic element, called the first element, opposite the magnetic element, called the second element, borne by the body of the system. Preferably, the system is designed so that the movement by magnetic attraction of the body to the second position occurs when the second stop means have gone beyond the first stop means in the direction of extraction of the piston. In this regard, so that the body is held in its second position in a state so that its second stop means are placed opposite the first stop means, but without contact with the latter, it is then preferable for the extraction of the piston to be stopped only after the body has reached its second position. This ensures the presence of the desired play between the first and the second stop means, when the piston occupies its final desired extracted position.

By way of indication, the magnetic attraction observed does not preferably lead to the contact of the permanent magnet on the magnetic body, but only to an approach between these two elements due to the rotation of the body with respect to the piston, according to the aforementioned pivot axis. This can, for example, be obtained by a suitable abutment of the body against the cylinder element, during the rotation thereof.

In addition, also in the preferred embodiment of this invention, said device is designed to ensure the movement of the body from said second position to said first position by electromagnetic repulsion of the first element and the second element, in which the latter is electrically powered by said electrical power supply so as to generate a magnetic field ensuring said repulsion.

When an operator decides to retract the piston into the cylinder, he/she must first perform the unlocking of the cylinder element, which was previously locked automatically by the arrangement of the first and second stop means opposite one another. This electromagnetic unlocking is therefore performed in the manner described above, by passing an electrical current through the magnetic body, for example in the form of electrical pulses. The magnetic body preferably made of ingot iron will then be magnetized and create a magnetic field, which, jointly with the magnetic field generated by the magnet itself, will ensure the desired repulsion.

To best avoid the risks of locking of the cylinder element, it is possible to provide a single manual control enabling the operator, after actuation of it, to cause first the movement of the body from the second position to the first position, then the retraction of the cylinder element, in particular by an appropriately programmed sequencer or the like. However, two distinct control means could be provided in order to ensure the two operations mentioned above, without going beyond the scope of the invention.

In this regard, the cylinder system also has a control module, which is in particular connected to said electrical power supply of said electromagnetic attraction/repulsion device. Preferably, said control module comprises at least one actuation push button, and preferably two buttons respectively intended to control the extraction of the piston and to control the electromagnetic unlocking of the piston and its retraction into the cylinder.

Preferably, said first and second elements each take the form of an angular portion of a hollow cylinder, easily implantable on the cylindrical components with a circular cross-section normally constituting cylinder systems.

Also preferably, said second stop means are arranged at the free end of an internal hollow rod forming an integral part of said body. In such a case, said body occupies said first angular position, and said hollow rod is substantially parallel to said piston. In addition, said hollow rod has another end preferably securely connected to an end portion of the hinged body on said external end of the piston.

Preferably, said body forms a casing around said cylinder element, and said casing can, for example, take the form of a tube internally holding the aforementioned hollow rod.

Preferably, the system comprises a connection fitting of the system, pivotably connected to said external end of the piston, according to said pivot axis, which advantageously makes it very compact.

Also preferably, said first and/or second stop means are equipped with a coating forming a friction surface. Thus, if an involuntary pressure exerted on the locked cylinder element accidentally causes a retraction of the piston into its associated cylinder, the first and second stop means quickly establish contact more easily preserved by the presence of the friction coating, capable, for example, of taking the form of a coating of rubber or a similar material.

Preferably, the system also comprises mechanical emergency control means, making it possible to ensure the movement of the body from said second position to said first position, or vice versa. These entirely mechanical emergency means effectively enable an operator actuating them to perform the task(s) normally performed by the electromagnetic attraction/repulsion device, if the latter breaks down, in particular if there is a power failure. In the preferred embodiment in which only the movement from the second position to the first position is performed with the electrical power supply of the device, the mechanical emergency control means make it possible only to ensure the movement of the body from said second position to said first position, by rotation of said same body around the aforementioned pivot axis.

As mentioned above, the invention can relate to any type of hatch, for example pivotably mounted on an aircraft structure, and in particular intended to enable the passage of occupants from one space to another on said aircraft.

Thus, the possible retraction of the piston into the cylinder, described above and capable of occurring as a result of an involuntary pressure exerted on the deployed cylinder element, can for example be caused by an occupant of the aircraft walking on said same hatch held in the open position by the piston occupying its extracted position.

Finally, the invention also relates to an aircraft including at least one hatch as described above.

Other advantages and features of the invention will appear in the following detailed and non-limiting description.

This description is provided in reference to the appended drawings in which:

FIGS. 1a and 1b each show a diagrammatic perspective view of a hatch according to a preferred embodiment of the present invention;

FIGS. 5 to 8 show cross-section views diagrammatically showing the principle of operation of the cylinder system shown in the previous figures;

FIG. 10 shows a cross-section view along line X-X of FIG. 9;

FIGS. 13a and 13b show cross-section views diagramming the principle of operation of the second actuation means forming an integral part of the locking/unlocking means of the hatch, shown in FIGS. 9 and 10;

Figure 1A:
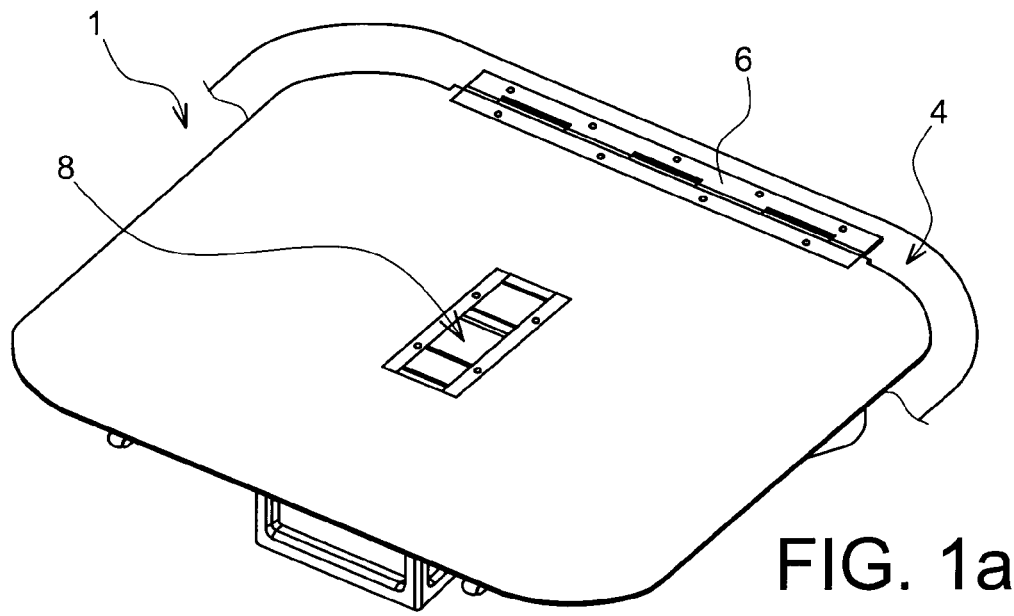
Figure 1B:
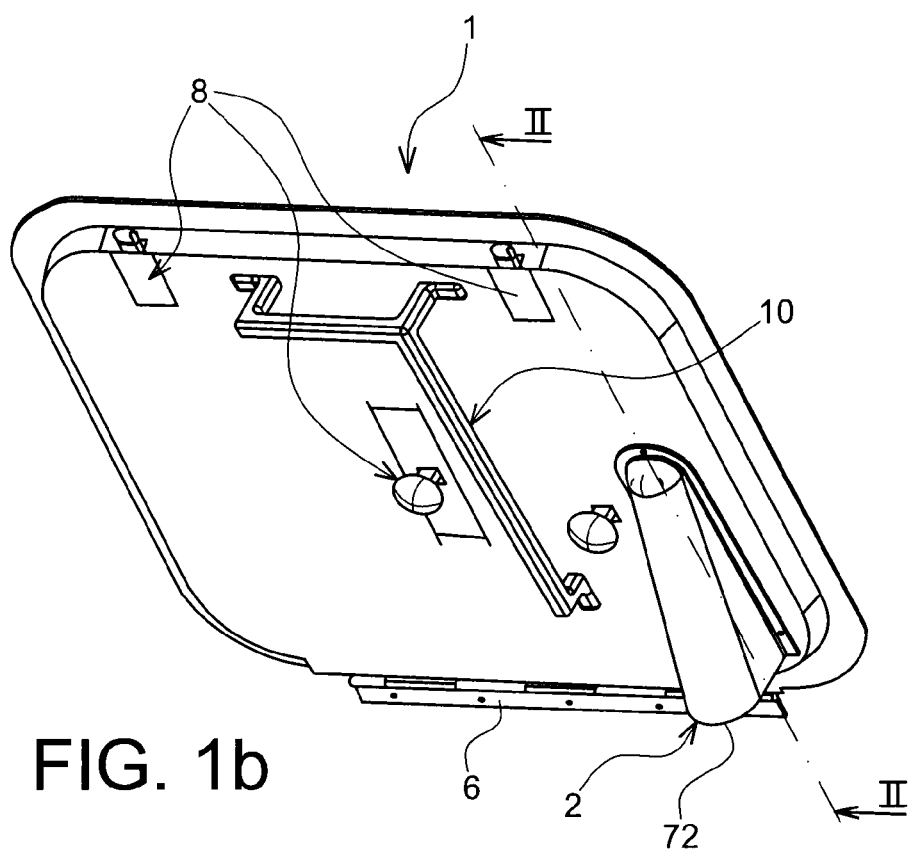

In reference first to FIGS. 1a and 1b, said figures show a hatch 1 for an aircraft, equipped with a system for opening/closing it, in which said opening/closing system is produced with a cylinder system 2, and said hatch 1 is also equipped with locking/unlocking means, generally referenced by the numeric reference 8.

The hatch 1 is pivotably mounted on an aircraft structure securely supporting a hatch frame 4 shown only partially and diagrammatically in FIG. 1a. By way of indication, this hatch is intended to enable the passage of occupants from one space to another on said aircraft, when it is in the open position. Preferably, it is a hatch arranged on a floor of the aircraft, such as the cockpit floor separating an upper cockpit area for piloting the aircraft, from a lower resting area for the team, also called "FCRC". Consequently, in the preferred embodiment described, the frame 4 can therefore be considered the cockpit floor.

The hatch 1 is pivotably mounted on the frame 4, by means of a hinge 6. In addition, the internal surface of the hatch shown in FIG. 1b can be equipped with gripping means 10 such as a bar or a set of bars, facilitating the opening and/or closing of this hatch by an operator located in the lower rest area for the flight crew.

Nevertheless, as shown above, the hatch 1 is equipped with a cylinder system 2 ensuring in an automatic and controlled manner the opening/closing of said hatch, by extraction/retraction of a cylinder piston driving the pivoting of the hatch about the hinge 6. Thus, the operator is not normally led to carry out the manual opening/closing of said hatch, except for example in the event of a breakdown preventing the proper operation of the cylinder system.

In reference now to FIGS. 2 to 4c, the cylinder system 2 according to the preferred embodiment of the present invention can be seen.

Figure 2:
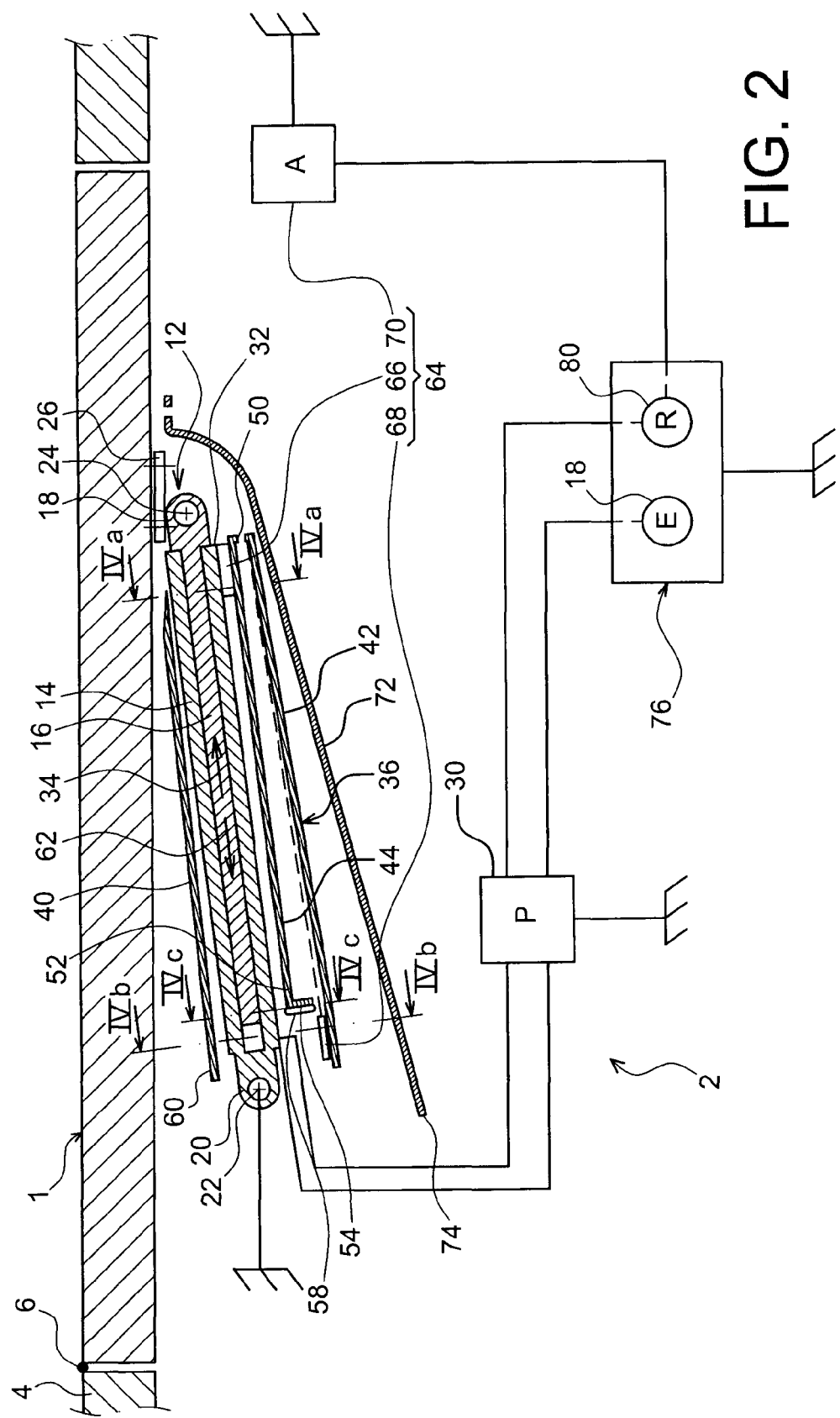
FIG. 2 shows a cross-section view along the line II-II of FIG. 1b.

The system 2 first includes a cylinder element 12 provided with a cylinder 14 into which a piston 16, with an external end 18, slides, opposite which a closed end 20 of the cylinder 14 is located. This closed end 20 is pivotably mounted, along an axis 22, on the stationary structure of the aircraft bearing the hatch frame 4, while the external end 18 of the piston is pivotably mounted, along an axis 24, parallel to the axis 22, on a connection fitting 26 of the system, which fitting is securely mounted on the hatch 1 as shown in FIG. 2.

By way of indication, it is noted that in the remainder of the description, the axis 24, which is parallel to the hatch 1, will be referred to as the pivot axis of the cylinder element 12.

The pneumatic or hydraulic cylinder element 12 is connected to a system for pressurizing a fluid in the cylinder 14, which pressurization system can take the form of a classic pump known to a person skilled in the art, diagrammatically shown by reference 30.

The cylinder 14 is equipped with first stop means, which, in the preferred embodiment described, are formed by the open end 32 of the cylinder. More specifically, these stop means 32 have a stop surface that is the end surface of the open end 32, orthogonal to a direction of extraction of the piston 34, which is parallel to this same piston 16 as well as to the cylinder 14. As will be detailed below, the first stop means 32 make it possible to ensure the locking of the piston 16 in the up position.

In addition, the cylinder system 2 includes a body 36 arranged around the cylinder element 12, in which said body preferably forms a casing round the cylinder element as can clearly be seen in FIGS. 2 to 4c.

Figure 3:
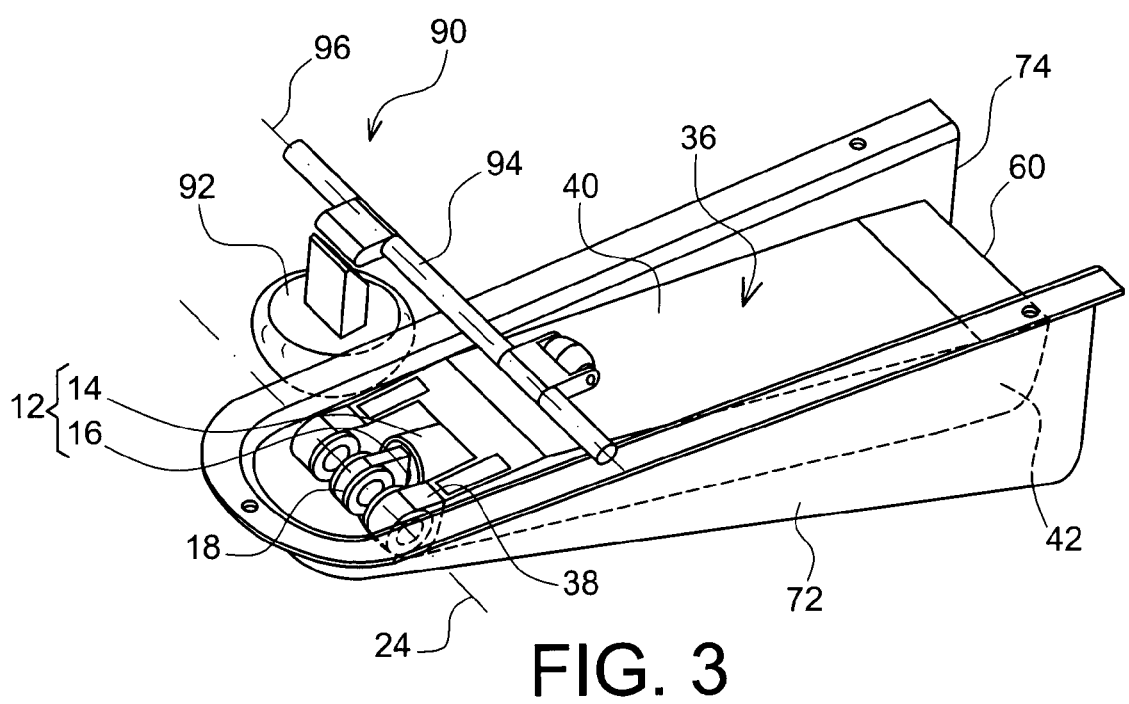
FIG. 3 shows an enlarged perspective view of the cylinder system shown in FIGS. 1b and 2, which cylinder system forms the system for opening/closing said hatch.

The body 36 has an end portion 38 shown in FIG. 3, of which one of the special features lies in the fact that it is pivotably connected to the external end 18 of the piston 16, according to the pivot axis 24. It is thus also pivotably connected to the connection fitting 26, also according to the same axis 24.

Figure 4A:
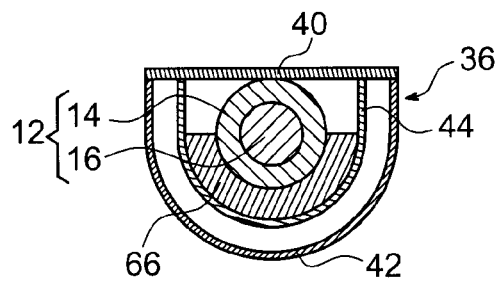
FIGS. 4a, 4b and 4c show cross-section views respectively along lines IVa-IVa, IVb-IVb and IVc-IVc of FIG. 2.
Figure 4B:
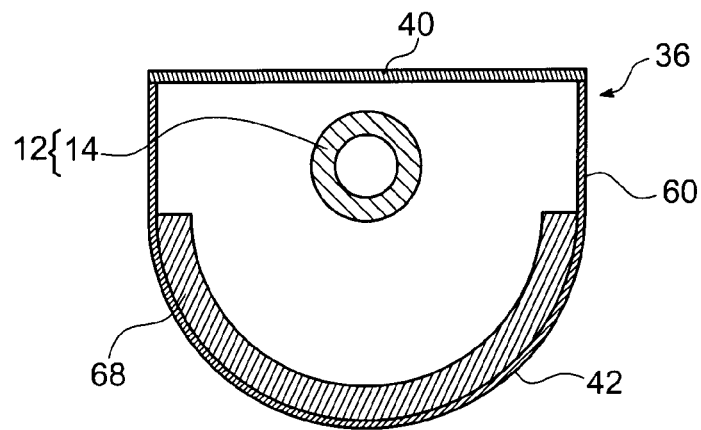
Figure 4C:
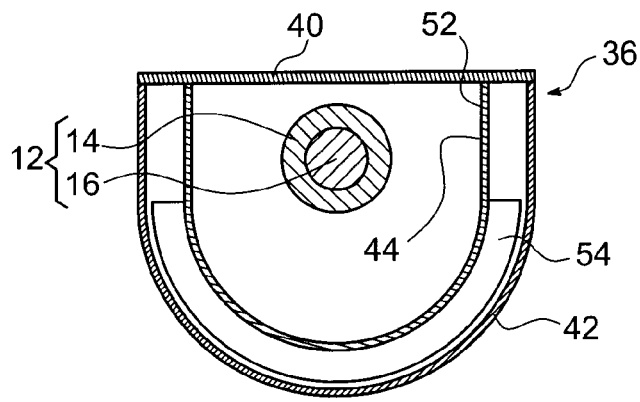

From this end portion 38, the body 36 extends around the piston 12 becoming slightly wider, as shown jointly in FIGS. 4a to 4c.

The external portion of the body 36 generally includes a planar surface 40 to the ends of which the ends of a cylinder surface 42, for example with a semi-circular cross-section, are securely connected.

Inside the external portion of the body 36 defined above is a hollow internal rod 44 forming an integral part of the body. This hollow rod 44 can also have a semi-circular cross-section, therefore longitudinally open, with its ends securely attached to the planar surface 40 as can best be seen in FIGS. 4a and 4c. Thus, the hollow rod 44 and the external cylinder surface 42 jointly delimit a space forming an annular portion extending from a rod end 50 attached to the pivotably connected end portion 38 of the body, to a free end 52 of the internal hollow rod.

In this regard, it is noted that second stop means 54 are arranged on the free end 52 of the internal hollow rod. More specifically, these stop means 54 have a stop surface that is the end surface of the free end 52, orthogonal to the direction of extraction of the piston 34. By way of indication, the second stop means 32 can be equipped with a coating 58 forming a friction surface, for example a coating of rubber or the like. In such a case, the stop surface is then formed by the coating itself. As will be detailed below, the second stop means 54 make it possible to ensure the locking of the piston 16 in the up position, jointly with the first stop means 32 by arranging said means 32, 54 opposite one another in the direction of extraction 34. Consequently, if an involuntary pressure exerted on the locked cylinder element 12 accidentally causes a retraction of the piston 16 into its cylinder 14, the first and second stop means 32, 54 are then capable of establishing contact more easily preserved by the presence of the friction coating 58.

As can best be seen in FIGS. 2 and 4c, the second stop means 54 can take the form of an angular collar portion extending toward the external cylindrical surface 42, with the aforementioned portion extending, for example, over 180°.

When the piston 16 occupies a retracted position as shown in FIG. 2, the body 36 occupies, with respect to the cylinder element 12 and according to the pivot axis 24, a first angular position allowing an extraction/retraction of the piston 16 with respect to the cylinder 14. In this first angular position with respect to the cylinder element 12, also called the unlocking position, the hollow rod 44 is substantially parallel to the piston 16, and therefore to the direction of extraction 34.

The body 36 has an open end 60 opposite the hinged end portion 38, which end 60 is jointly defined by the end of the planar surface 40 and the end of the cylinder surface 42. As shown in FIG. 2, this open end 60 is arranged beyond the second stop means 54, in a direction of retraction of the piston referenced 62. This open end 60, which is located near the closed end 20 of the cylinder 14 when the piston 16 is in the retracted position, essentially serves to support an electromagnetic attraction/repulsion device element, which will now be described.

Indeed, the cylinder system 2 is equipped with an electromagnetic attraction/repulsion device 64, including a first element 66 of the permanent magnet type securely mounted on the cylinder 14, as well as a second element 68 of the magnetic body type securely mounted on the body 36, which device 64 is designed to ensure the movement of the body from the first angular position to a second angular position, which will later be described in detail, and, conversely, by attraction/repulsion of the first and second elements 66, 68.

The first and second elements 66, 68 are preferably respectively attached externally to the open end 32 of the cylinder 14, and internally to the open end 60 of the body 36. To do this, they each preferably take the form of an angular portion of a hollow cylinder, as can be seen in FIGS. 4a and 4b.

More precisely, the permanent magnet 66 does not extend beyond the aforementioned stop surface of the first stop means 32, in the direction of extraction 34. In addition, the external surface of this magnet 66 can be complementary to the internal surface of the hollow rod 44, as shown in FIG. 4a. Thus, during the extraction of the piston 16, the permanent magnet 66 slides along the internal surface of the hollow rod 44 forming a track, with which it remains in contact. Nevertheless, an absence of contact between the two entities mentioned above could be envisaged, without going beyond the scope of the invention.

In addition, the magnetic body 68 preferably made of ingot iron and capable of being electrically powered by an electrical power supply 70 belonging to the device 64, does not extend beyond the aforementioned stop surface of the second stop means 54, in the direction of extraction 34. In other words, the entire magnetic body 68 is located beyond the stop surface of the second stop means 54, in the direction of retraction 62.

As can be seen in FIGS. 2 and 3, the cylinder system 2 can include a protective cover 72 making it possible to confine the body 36 and the cylinder element 12 between this same cover 72 and the hatch 1, while allowing the extraction of the piston 16 by its opening 74.

In addition, the cylinder system 2 comprises a control module 76, which is in particular connected to the electrical power supply 70 of the electromagnetic attraction/repulsion device 64. Preferably, the control module 76 comprises an actuation push button 78 intended to control the automatic extraction of the piston 16, and an actuation push button 80 intended to control, in an automatic and sequenced manner, the electromagnetic unlocking of the piston 16 as will be described below, then its retraction into the cylinder 14.

By way of indication, the aforementioned control module can be split, so as to provide a first one accessible to the operator located in the upper cockpit area, and a second one accessible to the operator located in the lower rest area.

The operation of the cylinder system 2 presented above will now be described.

First, when the hatch 1 is located in the closed position, as shown in FIG. 2, the piston 16 occupies a retracted position meaning that it is entirely inserted into its associated cylinder 14. In this configuration, the body 36 occupies, with respect to the cylinder element 12 and according to the pivot axis 24, the first angular position allowing an extraction/retraction of the piston 16 with respect to the cylinder 14. In this regard, it is noted that this first angular position is maintained during the near-totality of the extraction of the piston, given that the implantation of the cylinder system 2 is such that, during this same extraction of the piston 16, the planar surface 40 of the body 36 remains in contact/abutment by gravity against the external surface of the cylinder 14.

When the operator wants to open the hatch 1, he/she actuates the actuation push button 78 provided for this purpose on the control module 76, which button controls the pump 30 so as to pressurize the fluid inside the cylinder 14. This pressurization of the incompressible fluid causes the extraction of the piston 16 from the cylinder 14, according to the direction of extraction 34. Of course, prior to this extraction of the piston, the unlocking of the hatch is achieved as described below.

During this extraction, in which the aforementioned first angular position of the body 36 with respect to the cylinder element 12 is therefore substantially preserved, the cylinder element pivots about the axis 22 with respect to the structure of the aircraft bearing the frame 4. In addition, this extraction causing the gradual opening of the hatch 1 pivoting about the hinge 6 also causes a relative rotation of the external end 18 of the piston with respect to the connection fitting 26, according to the pivot axis 24. As shown in FIG. 5, the planar surface 40 therefore remains in contact by gravity with the external surface of the cylinder 14, while the permanent magnet 66 slides with respect to the internal rod 44 forming a track with which it remains in contact, according to the direction of retraction 62.

Figure 6:
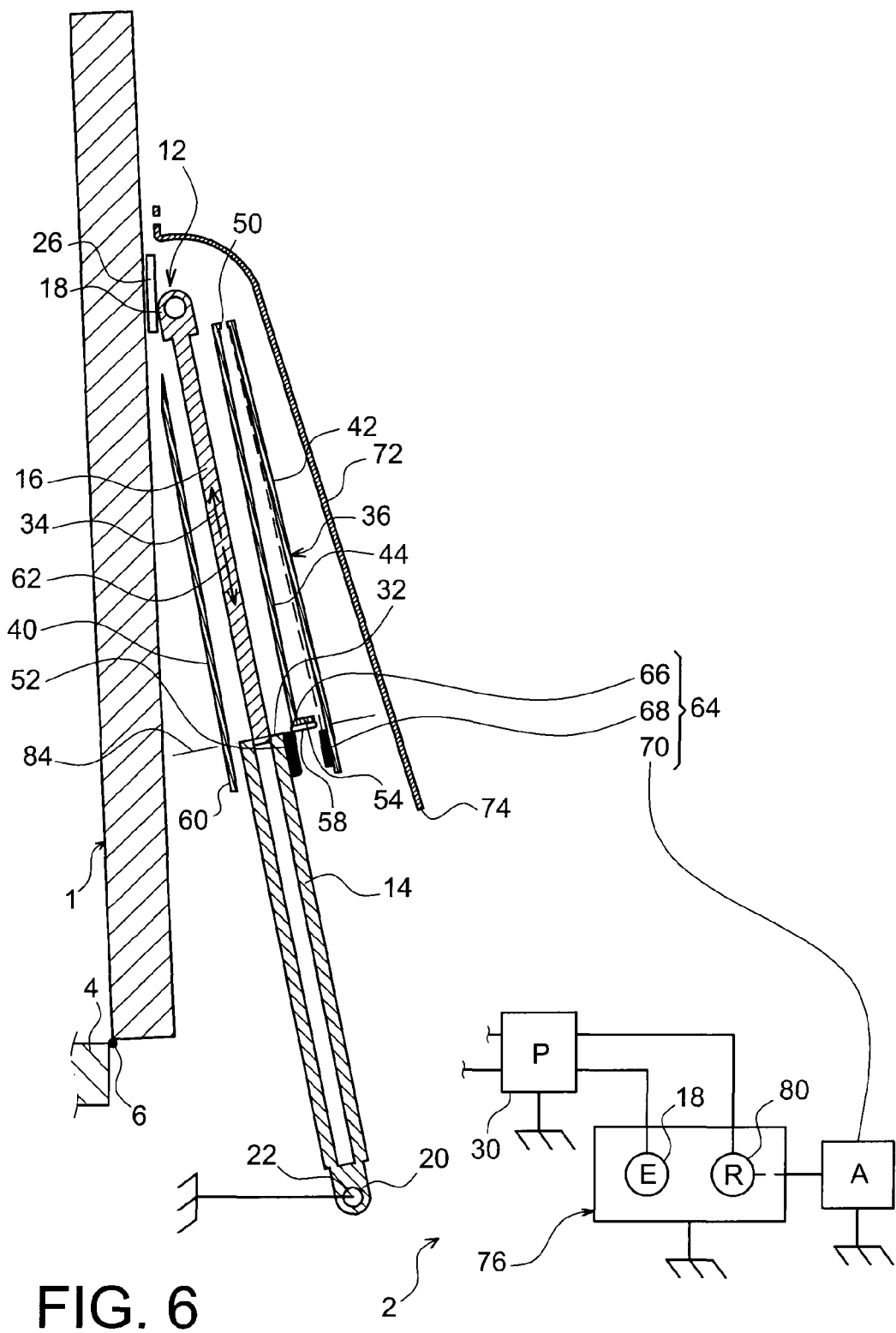

The principle described above is encountered during the extraction of the piston 16 until the two stop surfaces respectively belonging to the first stop means 32 and to the second stop means 54, in this case including the coating 58, reach the same plane substantially orthogonal to the cylinder element, diagrammatically shown with line 84 in FIG. 6. After this instant, i.e. once the piston occupies, with respect to the cylinder, an extracted position so that the second stop means 54 are located beyond the first stop means 32 in the direction of extraction 34, there is an automatic movement of the body 36 from the first angular position to a second angular position with respect to the cylinder element 12, by magnetic attraction of the permanent element 66 and the magnetic body 68 not electrically powered.

Figure 7:
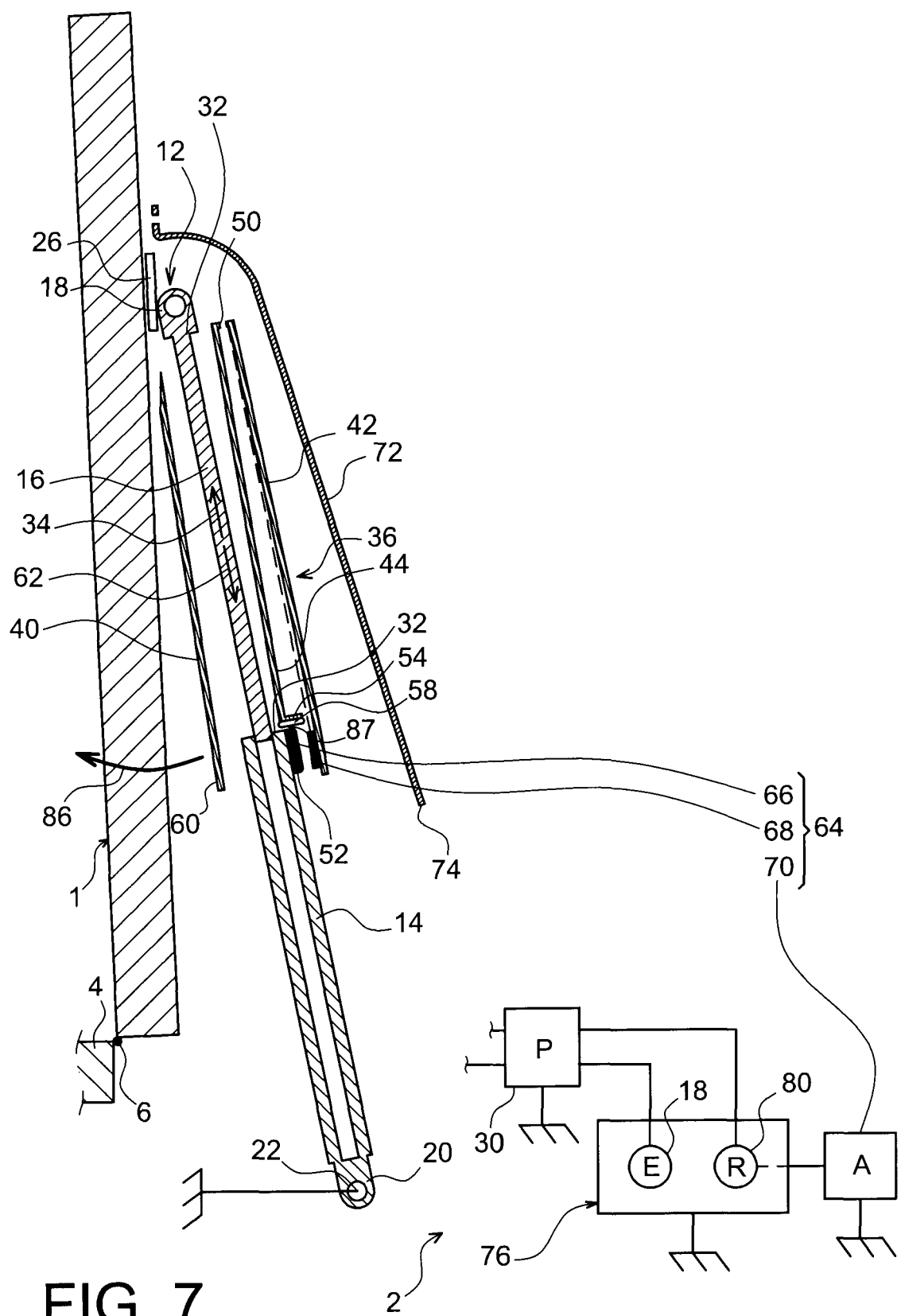

This magnetic attraction opposing gravity causes a rotation of the body 36 about the pivot axis 24 with respect to the piston 16, as shown diagrammatically with the arrow 86 in FIG. 7.

The system 2 is therefore designed so that the magnetic attraction occurs automatically, without an intervention by the operator, once the piston 16 is sufficiently extracted from the cylinder 14 in order to place its magnetic element 66 opposite the magnetic element 68. In addition, the system 2 is also designed so that the movement by magnetic attraction of the body 36 to its second position or locking position occurs once the second stop means 54 have gone beyond the first stop means 32 in the direction of extraction 34. Thus, even if, in the configuration shown, the magnetic force begins to be exerted before the second means 54 have gone beyond the first means 32, the rotation of the body 36 about the pivot axis 24 is prevented by the stop of the magnet 66 against the hollow rod 44 forming a track, on which it slides longitudinally.

In order fro the body 36 to be held in its second position in a state so that its second stop means 54 are placed opposite the first stop means 32, but without contact with the latter, the extraction of the piston 16 is stopped only after the body 36 has reached its second position. This ensures the presence of a play 87 between the first and the second stop means 32, 54, when the piston 16 occupies its final desired extracted position shown in FIG. 7, also called the up position.

The desired play 87 in the direction of extraction 34 between the stop surfaces of the first and second stop means 32, 54 is preserved as long as the hatch 1 remains in its open position. It is thus noted that, in the possible event of a retraction of the piston 16 into the cylinder 14, capable of occurring as a result of an involuntary pressure exerted on the cylinder element, for example by an occupant of the aircraft walking on said hatch, the retraction will then be limited owing to the quick contact between the first and second stop means previously arranged opposite one another. Therefore, the accidental closure of the hatch 1 will advantageously be stopped directly, which eliminates any risk of involuntary closure of the hatch 1 in its frame 4.

Figure 8:
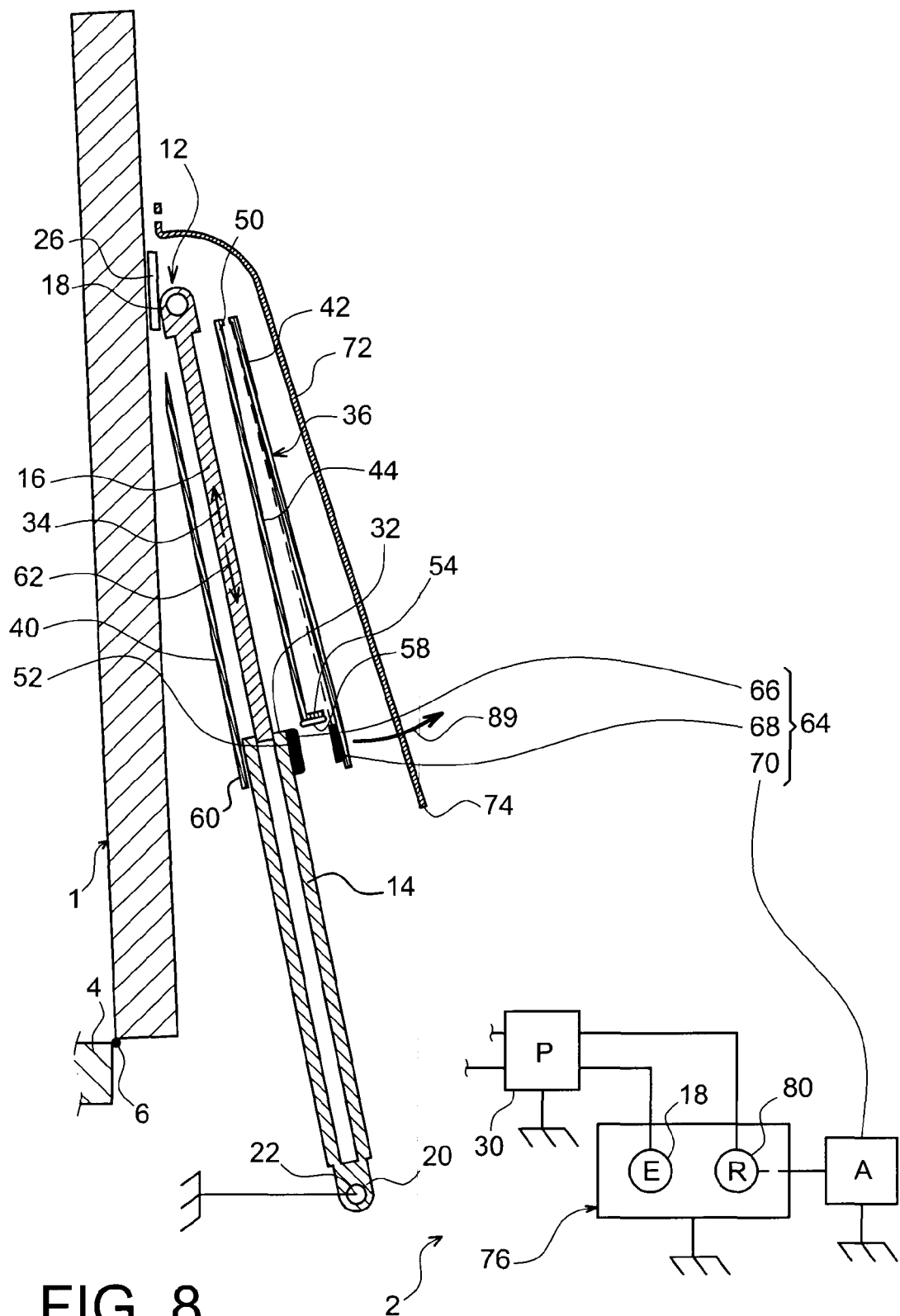

When the operator wants to re-close the hatch 1, he/she then exerts a pressure on the actuation push button 80 making it possible to successively generate two distinct operations. The first operation is intended to control the power supply 70 of the device 64, so that electrical pulses are delivered to the magnetic body 68, in order to magnetize the latter. Thus, the magnetized body 68 generates a magnetic field ensuring, jointly with the magnetic field released by the permanent magnet 66, an electromagnetic repulsion of the elements 66, 68. This repulsion causes the body 36 to return to its first angular position with respect to the cylinder element 12, by pivoting about the pivot axis 24 as shown diagrammatically by the arrow 89 in FIG. 8. This return to the first position, facilitated by the absence of contact between the stop surfaces, is therefore achieved while the piston 16 still occupies, with respect to the cylinder 14, an extracted position so that the second stop means 54 are located beyond the first stop means 32, in the direction of extraction 34. Once the repulsion has occurred and the body 36 has been arranged in the first angular position or unlocking position, information is sent to the pump 30 so as to ensure the desired retraction of the piston 16, until the cylinder system 2 returns to its initial retracted configuration as shown in FIG. 2.

The cylinder system 2 also comprises mechanical emergency control means 90, visible in FIG. 3. They generally make it possible to ensure the movement of the body 36 from the second angular position to the first angular position. These entirely mechanical emergency means 90 effectively enable an operator actuating them to perform the task normally performed by the electromagnetic attraction/repulsion device, if the latter breaks down, in particular if the electrical power supply of the magnetic body 68 is cut off.

For example, the means 90 comprise an actuation push button 92 capable of being pressed by an operator in a direction orthogonal to the hatch plane. The end of the push button 92 moved in said direction is intended to cause a rotation of a rod 94 according to its own axis 96, which rod is arranged parallel to the hatch plane, and for example parallel to the aforementioned axis 22, 24. This rod 94 has a pressure roller capable of applying a force on the planar surface 40 of the body 36 during a rotation of the rod 94 according to its own axis 96, which force therefore generates, entirely mechanically, the desired pivoting of said same body 36 about the pivot axis 24. The pivoting caused, opposing the magnetic force between the elements 66, 68, enables the body 36 to return to its first angular position with respect to the cylinder element 12 remaining stationary, a preliminary condition for the retraction of the piston 16 into the cylinder 14.

Figure 9:
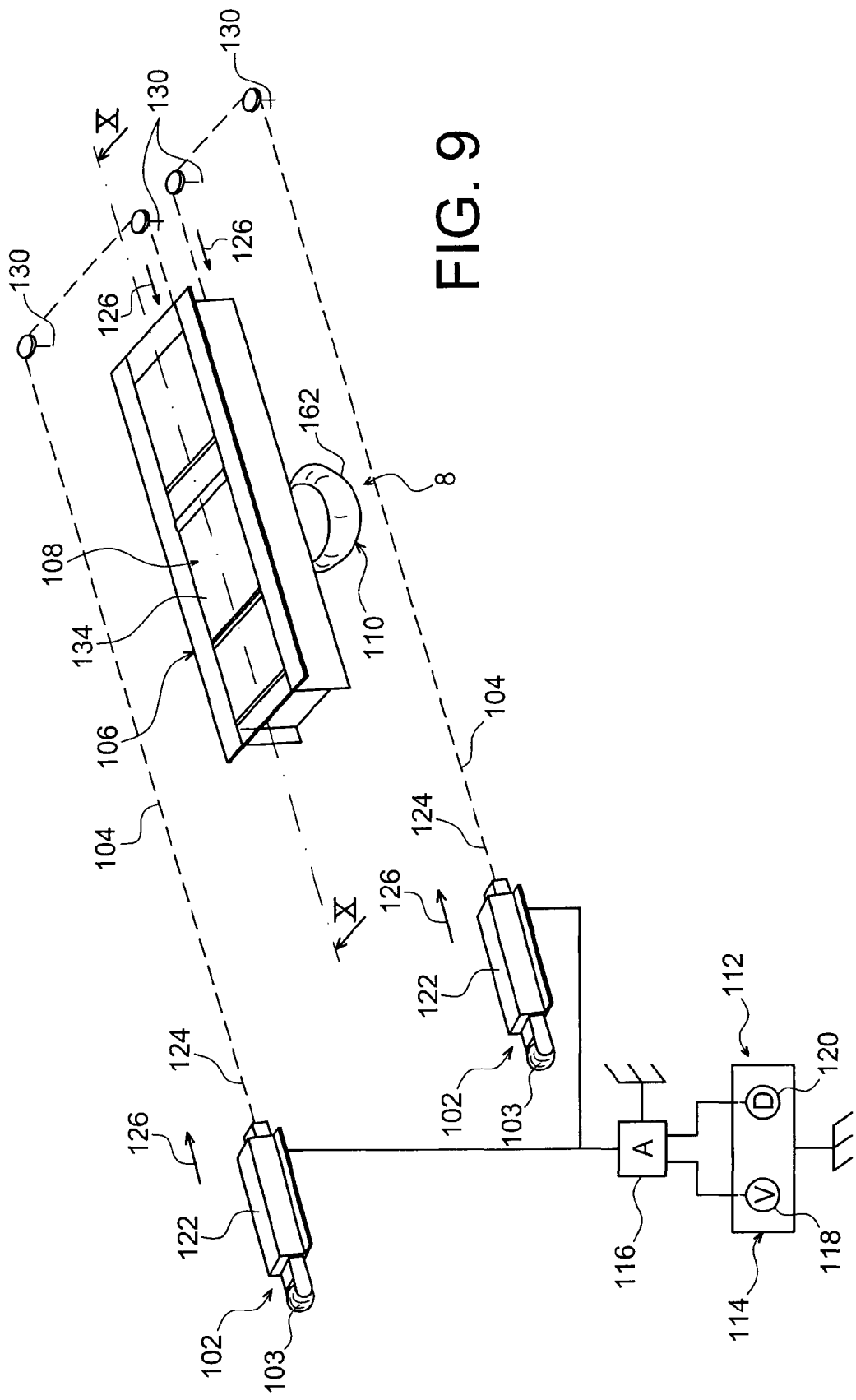
FIG. 9 shows an enlarged perspective view of the locking/unlocking means of the hatch, shown in FIGS. 1a and 1b.

In reference now to FIGS. 9 and 10, the means for locking/unlocking 8 the hatch 1, already mentioned in reference to FIGS. 1a and 1b, can be seen.

Generally, these means 8 include two hatch locking sockets, referenced 102, two flexible linear pulling members 104, respectively intended to cooperate with each of the two sockets 102, an emergency actuation module 106 including first actuation means 108 as well as second actuation means 110, and a main actuation system 112 for the locking sockets 102.

More specifically, the main actuation system 112 of the sockets is an electromagnetic system. It thus comprises, for example, a control module 114, which is connected to an electrical power supply 116 of the system 112. Preferably, the electrical power supply 116 can be identical or coupled to the electrical power supply 70 described above, for the magnetization of the ingot iron of the cylinder system 2.

Preferably, the control module 114 comprises an actuation push button 118 intended to control the extracted locking positioning of the sockets 102, and an actuation push button 120 intended to control the retracted unlocking position of the sockets 102. It is thus indeed noted that each socket 102 is slidingly mounted in a body securely mounted on the hatch 1, so that it is capable of alternately occupying each of the two aforementioned positions, as needed.

In the preferred case in which the main actuation system 112 is an electromagnetic system, the pressure on the button 118 effectively makes it possible to order the electrical power supply 116 to deliver a current to each socket assembly 102, 122, in order to generate an electromagnetic force pushing the locking socket 102 concerned to move toward its retracted unlocking position. However, the pressure on the button 120 makes it possible, for example, to cancel this order for electrical power to the socket assembly 102, 122, which causes the locking socket 102 to return to its extracted locking position, under the action of resilient return means (not shown) of the spring type, effectively designed to force the socket 102 to return to its extracted locking position when no more electromagnetic force is produced in the assembly 102, 122.

By way of indication, the control module 114 can be split, so as to provide a first one accessible to the operator located in the upper cockpit area, and a second one accessible to the operator located in the lower rest area, i.e. a separate module accessible on each side of the hatch 1.

For example, it would also be possible to partially combine the control modules 114 and 76, by providing a single push button instead of the two buttons 120 78 mentioned above. Indeed, the addition of a sequencer would make it possible, simply by pressing on this single push button, to cause, in a first step, the unlocking of the hatch by the movement of the sockets 102 into the retracted unlocking position, then, in a second step, the opening of said hatch by extraction of the piston of the piston system 2.

In addition, the means 8 therefore include two flexible linear pulling members 104 respectively intended to cooperate with each of the two sockets 102. Each member 104 takes the form of a flexible cable, a chain, or a rope. Its first end 124 is secured to the associated unlocking socket 102, so that when the member 104 is urged in an unlocking direction, it causes a movement of the socket 102 from the extracted locking position to the retracted unlocking position. For information, the unlocking direction referenced 126 in the figures follows the linear member 104, and has a specific direction corresponding to that going from the first member end 124 to a second member end 128 connected to the second actuation means 110, as will be described in detail below.

Thus, given that it is preferable to arrange each member 104 so that it forms a loop, enabling it for example to make a 180° turn, in particular by means of pulleys 130, the unlocking direction 126 associated with the pulling member 104 changes according to the point considered of said member, as is shown diagrammatically with the various arrows referenced 126 in FIG. 9.

However, it is naturally possible for each member/cable 104 to remain straight between its two ends, without going beyond the scope of the invention. In such a case, the unlocking direction 126 then remains identical regardless of the point considered of said member.

The linear members 104 are not intended to cooperate with the main actuation system 112 of the sockets 102, but with the emergency actuation module 106 including the first and second actuation means 108, 110, of which the design is preferably entirely mechanical. Thus, when the main actuation system 112 fails, for example due to an electrical power supply failure, the occupant must manually unlock the hatch 1. This manual unlocking is possible owing to the actuation of any one of the first and second actuation means 108, 110, in the direction in which such an actuation urges the member 104 in the unlocking direction 126, causing the simultaneous movement of the two locking sockets 102 from the extracted locking position to the retracted unlocking position.

In reference more specifically to FIG. 10, it can be seen that the second end 128 of each member/cable 104 is connected to an element of the second actuation means 110, as will be described in detail below. In addition, beyond this second end 128 in the direction opposite the unlocking direction 126, the linear member 104 securely bears a stop member 132 capable of taking the form of a pin or a shaft, for example perpendicular to the member 104, and parallel to the plane of the hatch 1.

In this regard, the first actuation means 108 include a pivoting lever 134, according to an axis 135 parallel to the stop member 132 on each side of which are located a so-called contact end 136 capable of coming into contact with said stop member 132, and another so-called gripping end 138 accessible from a first side 140 of the hatch, which first side 140 is delimited by a first external hatch surface 142. In the preferred embodiment described, the first side 140 corresponds to the upper cockpit area.

In the resting position as shown in FIG. 10, it is seen that the lever 134 takes the general form of an L, of which the base and the branch are relatively inclined by a value between 90° and 130°, for example 120°, with the base of the L in contact or very near the stop member 132, and the branch of the L substantially parallel to the first end surface 142 of the hatch.

In this way, it is preferable that, in this resting position, the lever 134 be flush with the first external surface 142. More specifically, the external surface of the branch of the pivoting lever 134 is preferably located substantially in the same plane as the first external surface 142, which external lever branch surface does not project outwardly from the first surface 142. In addition, the base of the lever 134, considered to be the contact end 136, does not project outwardly from the first surface 142, given that it projects into the module 106, and therefore into the hatch 1 securely holding said module 106.

This special feature makes it possible to prevent any obstruction for an occupant walking on the first external surface of the hatch.

As will be described in reference to the next figures, the first actuation means 108 are designed so that the urging of the member 104, by rotation of the pivoting lever 134, is obtained by moving the gripping end 138 away from the first surface 142, i.e. by pulling said gripping end 138 toward the outside of the hatch.

It is thus noted that the module 106 includes an internal space 140 for access to the gripping end 138, which internal access space 146 is closed by a cover 148 pivoting according to a shaft 150 parallel to the shaft 135.

One of the special features of this cover 148 is that it is flush with the first external surface 142 and the branch of the pivoting lever 134, of course when the various elements concerned occupy their resting position. Again, it can be considered that its external surface is located substantially in the same plane as the first external surface 142 and as the external surface of the branch of the lever 134, which external cover surface therefore does not project outwardly from the first surface 142.

In addition, a cover 152 for access to an internal handling space 154 located in the module 106 is provided, which cover 152 securely and removably mounted on the body of said module is located so that the lever 134 is placed between the covers 148, 152 in the unlocking direction 126. Thus, when the operator wants to access the first and/or second actuation means 108, 110 for handling, he/she simply needs to remove the cover 152, for example mounted by screwing. By way of indication, this internal handling space 154 enables the operator to have access to the connection between the second member end 128 and the second actuation means 110, so that said connection can easily be repaired if it is accidentally broken.

Preferably, a cutout 156 formed in the first external surface 142, and more precisely the cutout 156 provided in module 106 for the housing of the first actuation means 108, is substantially entirely filled by the external surface of the covers 138, 152 and the external surface of the branch of the lever 134, which three external surfaces are moreover arranged in the plane of the first external surface 142 of the hatch, so as to prevent any obstruction for an occupant walking on the latter.

In addition, the second emergency actuation means 110 are accessible from a second hatch side 158 delimited by a second external hatch surface 160 opposite and parallel to the first. In the preferred embodiment described, the second side 158 corresponds to the lower rest area for the crew.

The second means 110 include an actuation push button 162 accessible from the second side 158, and capable of being pushed in a direction substantially orthogonal to the hatch, as shown in FIG. 10.

It securely includes a pin 164, for example parallel to the shafts 135, 150 and to the stop member 132, and therefore orthogonal to the pushing direction 163 of the button 162, on which pin a connecting link 166 is pivotably connected at one of its ends 165, according to an axis 167 parallel to said same pin.

The other end 170 of the connecting link 166 is pivotably connected to an end 172 of a sliding member 174, also according to an axis 176 parallel to the axis 167.

The sliding member 174 is intended to slide with respect to the stationary body of the module 106 in the unlocking direction 126, and is therefore arranged parallel to the linear pulling member 104 and the external surfaces 142, 160. In addition, its other end 178 is connected to the second member end 128, as shown in FIG. 10.

The second actuation means 110 are generally designed so that a pressure on the push button 162 generates, by means of the connecting link 166, a movement of the sliding member 174 in the unlocking direction 126, and therefore a movement of the pulling member 104 in the same direction.

Figure 11A:
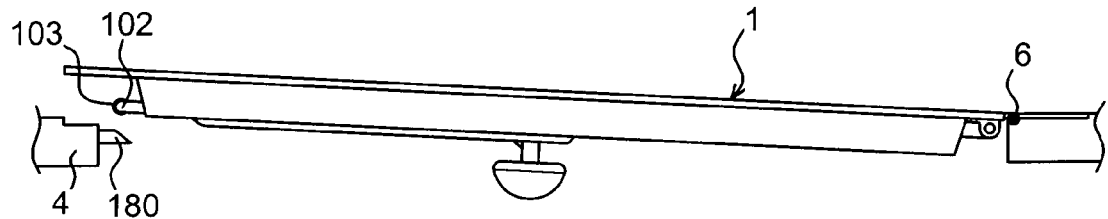
FIGS. 11a to 11c show cross-section views diagramming an end of the operation of closing the hatch shown in the previous figures.
Figure 11B:
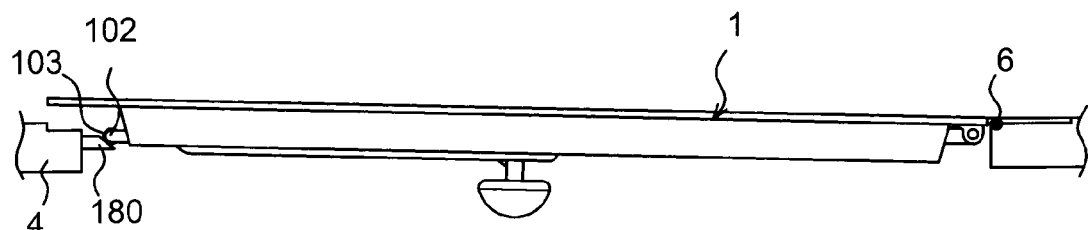
Figure 11C:
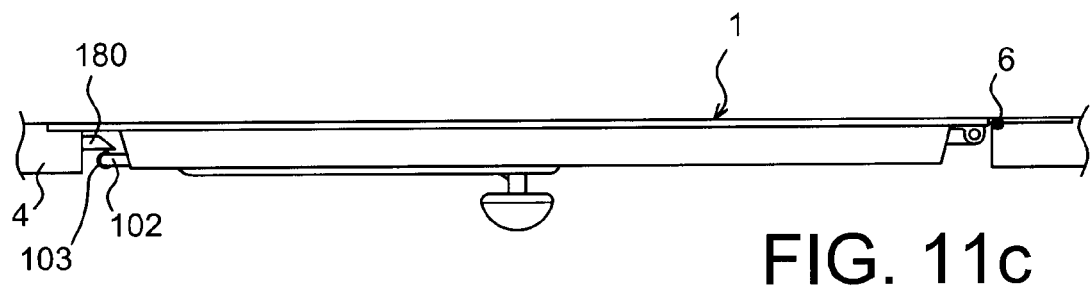

In reference now to FIGS. 11a to 11c, the end of a hatch 1 closing operation is shown, which closing is preferably achieved automatically by the cylinder system 2 described above.

At the end of this hatch 1 closing operation, each socket 102 occupies its extracted locking position, which it maintains due to the return force applied by the resilient means provided for this purpose, as is shown in FIG. 11a, At a given instant of the closing, each locking socket 102 located opposite the hinged edge of the hatch 1 comes into contact with an inclined ramp 180, formed on the frame/floor 4. The end of each socket 102 is equipped with a roller 103 that makes it possible to ensure proper gliding on the ramp 180. Thus, the ramp 180 is inclined so that the more the hatch 1 is closed, the closer the sockets 102 get to their retracted unlocking position, which movement of the sockets 102 toward this latter position results from the pressure against the ramp 180 generating an action opposing the force of the resilient return means. The retraction of the sockets 102 occurs when they have not left the ramp 180, as is shown in FIG. 11b. However, once the level of closing of the hatch 1 is such that the locking sockets 102 leave the ramp 180, these same sockets are then forced to return to their extracted locking position under the effect of the resilient return means, as shown in FIG. 11c. In this state, the hatch 1 is therefore considered locked, insofar as the sockets 102 located under the ramp 180 prevent said hatch from opening. Indeed, the pivoting of the hatch 1 about the hinge 6 would immediately cause the sockets 102 to abut against the internal portion of the ramp 180.

When the occupant of the aircraft wants to unlock the hatch 1 using emergency means provided for this purpose, he/she therefore has the choice between the first and the second actuation means 108, 110, according to his/her location on one side or the other of the hatch.

Figure 12A:
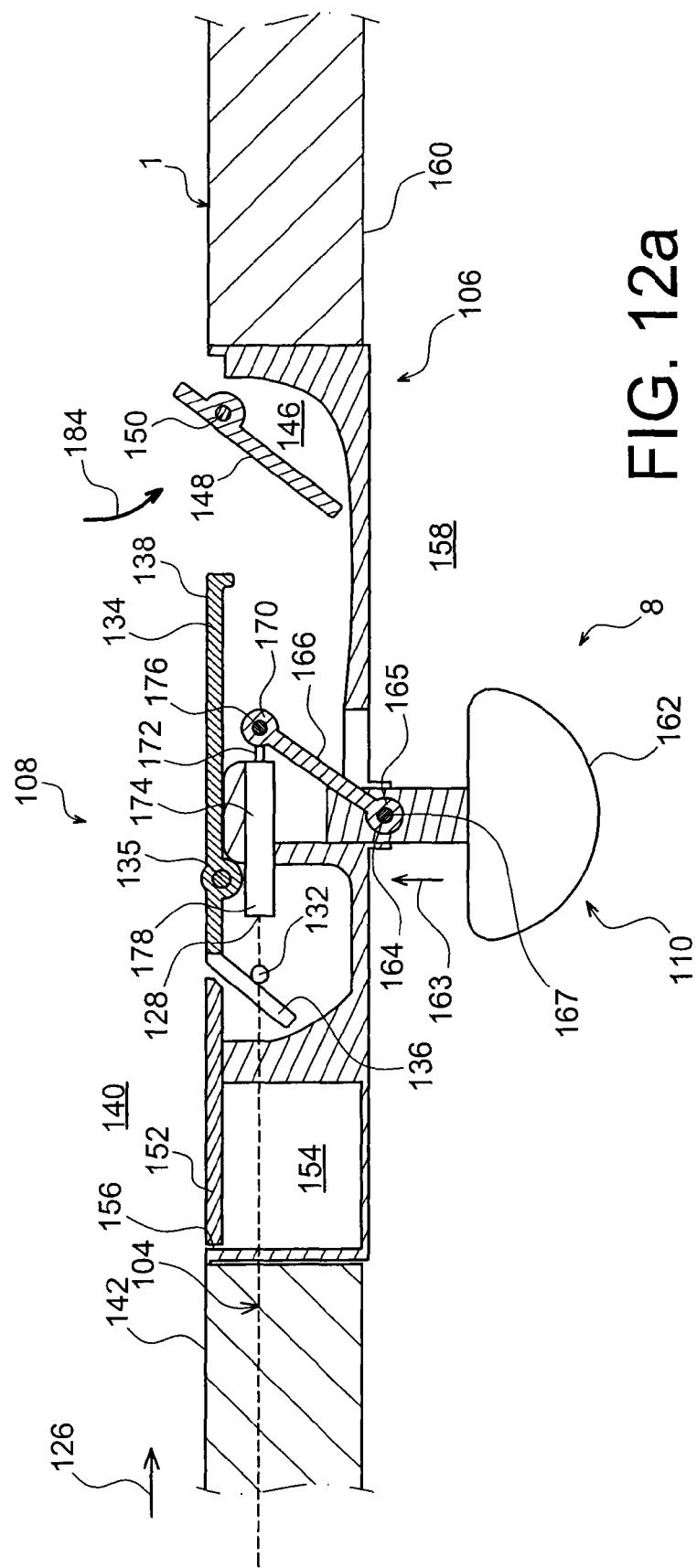
FIGS. 12a and 12b show cross-section views diagramming the principle of operation of the first actuation means forming an integral part of the locking/unlocking means of the hatch, shown in FIGS. 9 and 10.
Figure 12B:
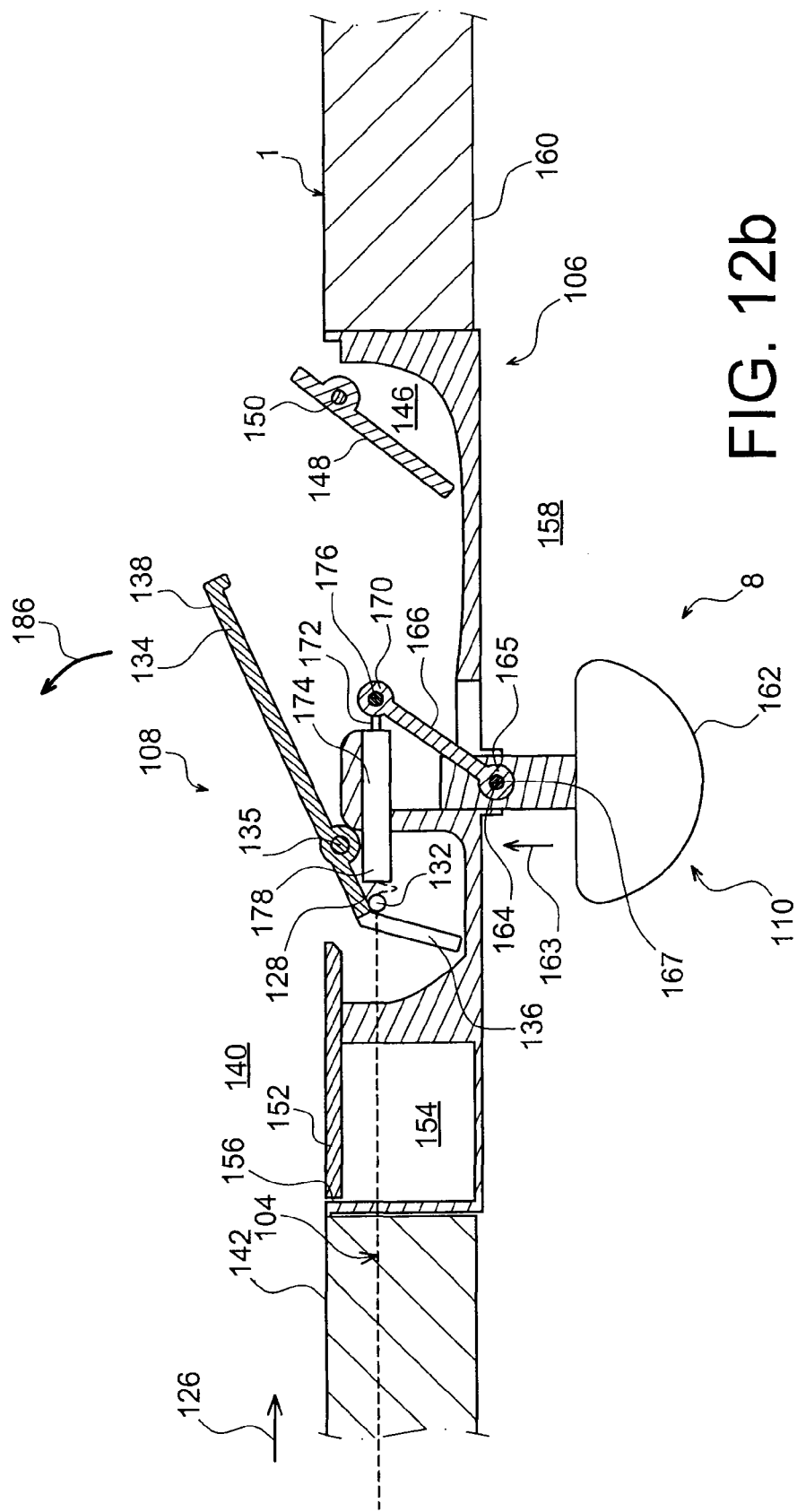

In reference now to FIGS. 12a and 12b, the principle of operation of the first actuation means 108 accessible for an operator located on the first side 140 of the hatch 1 will now be described.

First, the occupant pivots the hinged cover 148 according to the shaft 150, by pushing inside the space 146, the end of said cover 148, which is the closest to the lever 134. This operation is diagrammatically shown by the arrow 184 in FIG. 12a. Once this pivoting has occurred, the occupant can then insert his/her fingers into the interior access space 146, so as to grasp the gripping end 138. Once this end has been grasped, the occupant can pivot the lever 134 by moving said same gripping end 138 of the hatch 1 away, i.e. by directing it toward the outside of said hatch. As shown in FIG. 12b, in which the arrow 186 diagrammatically shows the pivoting of the lever 134, it can be observed that the pivoting performed has caused the stop member 132 to move in the unlocking direction 126, by abutment with the contact end 136. Thus, the portion 188 of the member/cable 104 located between the stop member 132 and the second member end 128 is relaxed, forming, for example, a relaxed loop as shown in FIG. 12b, so that this movement of the upstream portion of the member/cable 104 does not cause any movement of the second emergency actuation means. Naturally, the movement of the upstream portion of the pulling member 104, due to the movement in the unlocking direction of the stop member 132, causes the locking sockets 102 to move toward their retracted unlocking position. Finally, it is noted that when the unlocking is performed, the operator can relax the lever 134 and the cover 148, which, at the level of their respective axes of rotation, are equipped with a return spring bringing them back to their resting positions shown in FIG. 10.

In reference now to FIGS. 13a and 13b, the principle of operation of the second emergency actuation means 110, accessible from the second side 158, will now be explained.

Figure 13A:
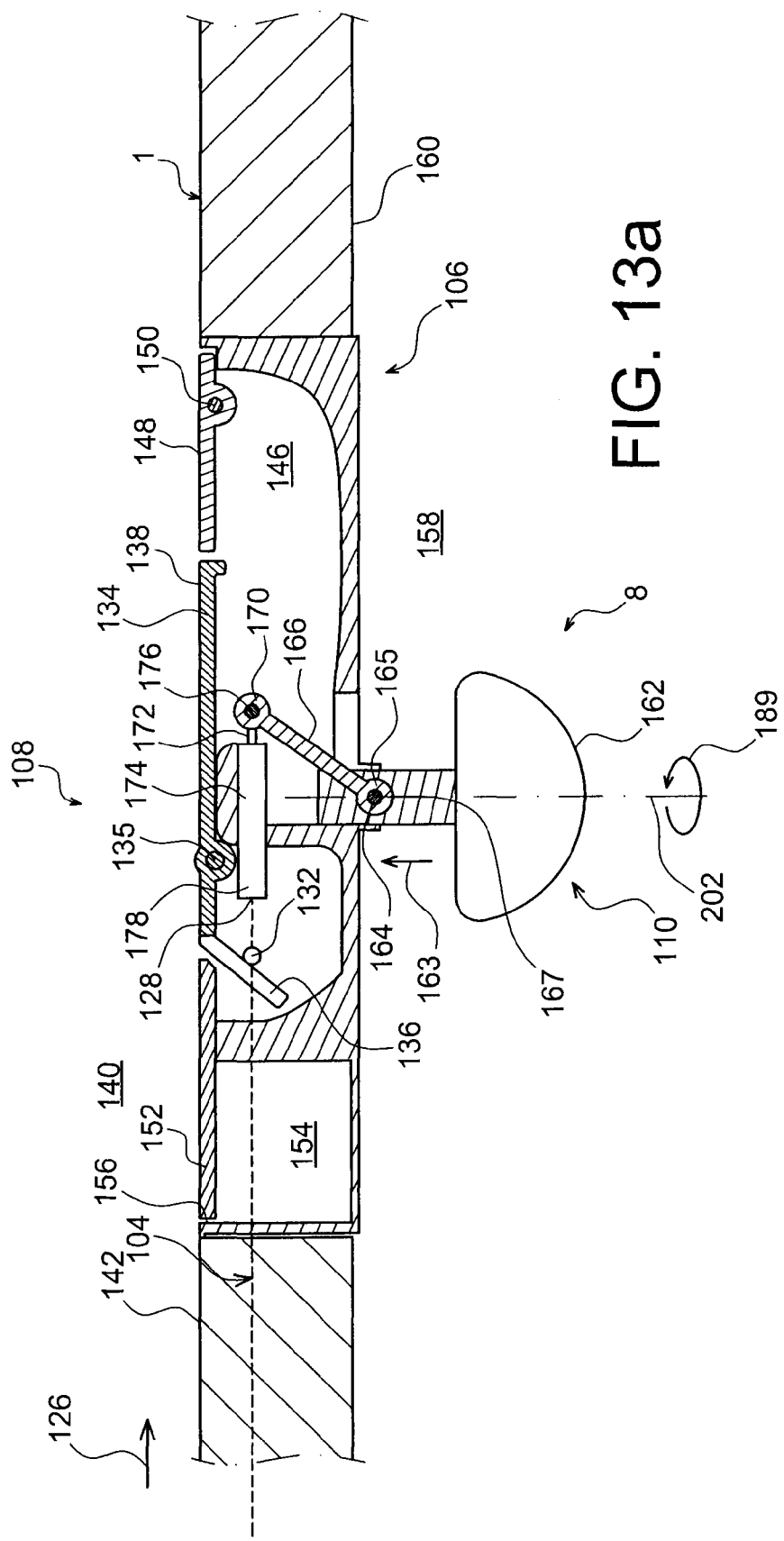

First, the push button 162 can be rotated about its own axis 202 so as to enable it to be pressed according to this same axis, as shown diagrammatically by the arrow 189 in FIG. 13a. Once this rotation has been performed, the occupant located on the second side 158 of the hatch 1 can effectively push the button in the direction 163, as shown diagrammatically by the arrow 191 in FIG. 13b, causing the connecting link 166 to pivot about its two axes 167, 176. In particular, the movement described by the intermediate connecting link 166 caused by pushing on the button 162 has the consequence of moving the sliding member 174 in the unlocking direction 126 as shown in FIG. 13b, essentially owing to the fact that the axis 167 moves toward the sliding member 174 when pressure is exerted on the button 162.

Of course, the sliding member 174 drives with it the member/cable 104, consequently generating the movement of the locking sockets 102 toward their retracted unlocking position. As is shown in FIG. 13b, the actuation of the second means 110 causes the stop member 132 to move in the unlocking direction 126, which moves it away from the contact end 136 of the pivoting lever 134 remaining in its resting position, as is also the case for all of the other elements forming the first actuation means 108.

Figure 14:
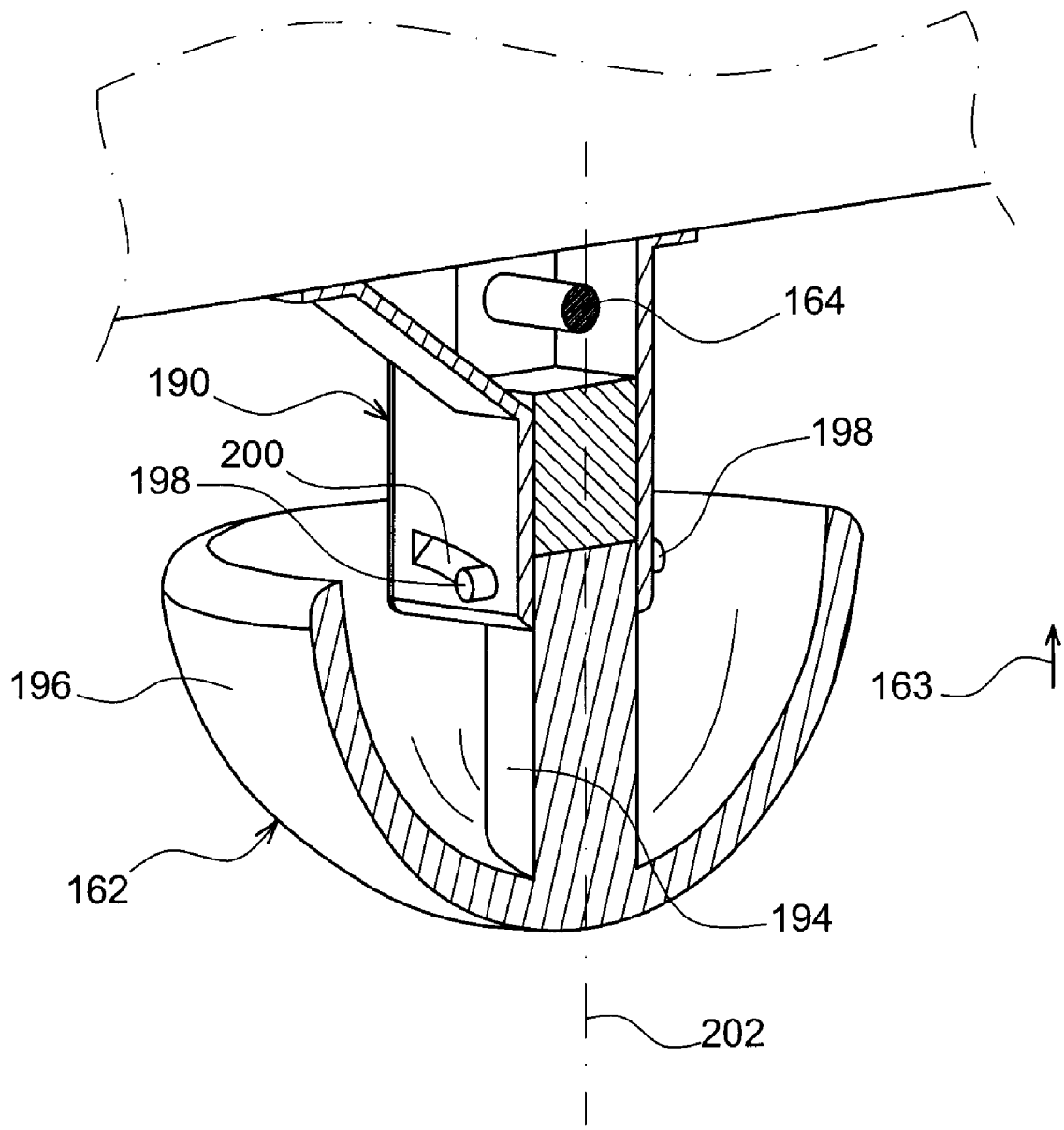
FIG. 14 shows a half-view in perspective, detailing a preferred embodiment of a support body of the actuation push button belonging to the second actuation means shown in FIGS. 13a and 13b.
Figure 15:
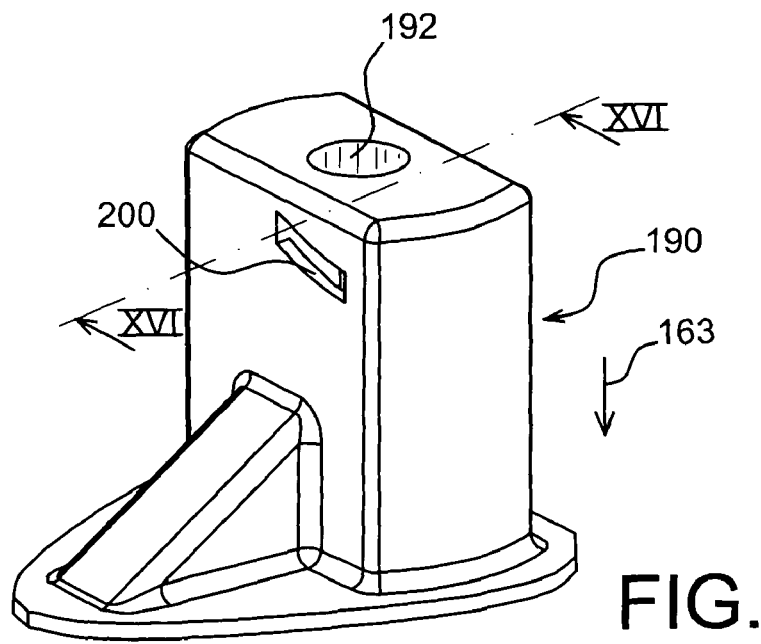
FIG. 15 shows a perspective view of the support body shown in FIG. 14.
Figure 16:
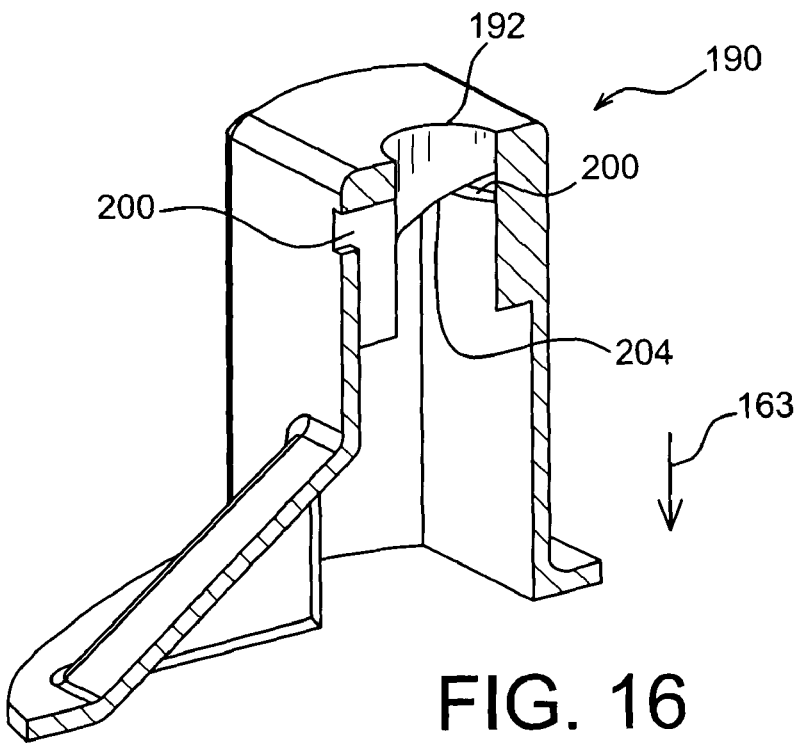
FIG. 16 shows a cross-section view along line XVI-XVI of FIG. 15.

In reference now to FIGS. 14 to 16, a support body 190 of the push button 162 can be seen, which body has a design requiring a rotation of the button 162 to be applied before it can be pushed in the direction 163.

Indeed, this support body 190 has a circular orifice 192 passed through by a cylindrical rod with a circular cross-section 192 of the button 162, of which the end arranged externally with respect to the body 190 securely holds the poppet 196 of the same button, intended to be contacted by the occupant's hand.

At the level of the portion of the rod 194 located in the body 190 mounted securely on the body of the module 106, are two lugs 198 opposite one another at 180°, secured to said rod 194 and respectively passing through two slots 200 provided on the body 190. Thus, in this state in which the lugs 198 are housed in their respective slots 200, a simple pressure on the poppet 196 in the direction 163 cannot cause the movement of the button in this same direction, due to the stop provided by the cooperation between the lugs and associated slots.

The occupant must therefore first rotate the poppet 196 about 90° according to the axis of the button 202 parallel to the direction 163, so as to extract the lugs 198 from the slots 200. It is noted that the button 162 is designed so that this rotation does not cause the rotation of the portion of the latter bearing the pin 164. Then, a pressure in this same direction 163 can effectively be exerted so as to move the entire button 162, given that there is no longer a stop between the lugs and the associated stops.

Although it has not been shown, resilient return means of the spring type are preferably provided, making it possible to automatically bring the button 162 back to its extracted position as shown in figure 14. In this regard, to ensure the reinsertion of the lugs 198 in the slots 200, an internal helical surface 204 is provided, shown in FIG. 16, of which the shape indeed ensures, when the lugs 198 come into contact with it, a gradual and automatic reinsertion of these lugs into the slots 200, as the button 162 returns to its extracted resting position. Simultaneously, to ensure such an automatic reinsertion of the lugs 198, under the simple effect of the resilient return means, the slots 200 are also provided with a slightly helical shape as shown in FIGS. 14 to 16.

Of course, various modifications can be made by a person skilled in the art to the invention described above merely in terms of a non-limiting example.

The invention claimed is:
1. A hatch comprising:
at least one socket slidingly mounted and capable of occupying an extracted locking position as well as a retracted unlocking position,
at least one flexible linear pulling member for said socket, a first member end of said pulling member being secured to said socket, said first member end being configured to move said socket from said extracted locking position to said retracted unlocking position when said first member end is urged in an unlocking direction, a first actuation means for moving said flexible linear pulling member in the unlocking direction, by abutting against a stop member secured to said flexible linear pulling member, at a distance from a second member end opposite said first member end, and said first actuation means being controllable from a first side of said hatch, a second actuation means for moving said flexible linear pulling member in the unlocking direction, wherein said second actuation means is connected to said second member end, and said second actuation means being controllable from a second side of said hatch, opposite said first side, wherein said first actuation means includes a pivoting lever with a contact end capable of abutting against said stop member secured to said flexible linear member, and with a gripping end accessible from said first side of said hatch, wherein said first actuation means is configured such that said flexible linear pulling member, by rotating said pivoting lever, is urged by moving said gripping end away from a first external surface of the hatch, located on said first side of the hatch, wherein, in a resting position, said pivoting lever is flush with said first external surface of the hatch, and further comprising an internal space for access to said gripping end of said pivoting lever said internal access space being closed by a hinged cover flush with said first external surface of the hatch and said pivoting lever.

2. A hatch according to claim 1, wherein said flexible linear pulling member for said socket is a flexible cable, a chain or a rope.

3. A hatch according to claim 1, comprising a plurality of locking sockets arranged to be movable simultaneously from said extracted locking position to said retracted unlocking position, when any one of the first and second actuation means is actuated.

4. A hatch according to claim 1, wherein each locking socket is equipped with its own main actuation system enabling its movement from said extracted locking position to said retracted unlocking position, with said first and second actuation means forming an emergency device.

5. A hatch according to claim 4, wherein said main actuation system is an electromagnetic system.

6. A hatch according to claim 1, wherein each socket is also equipped with resilient return means for returning the socket to its extracted locking position.

7. A hatch according to claim 1, wherein each locking socket is equipped at one end with a roller.

8. A hatch according to claim 1, comprising a system for opening/closing said hatch.

9. A hatch according to claim 8, wherein said opening/closing system comprises a cylinder system including a cylinder element provided with a cylinder into which a piston, with an external end, slides, said cylinder is equipped with first stop means, wherein said opening/closing system also includes:

a body arranged around said cylinder element and pivotably mounted on said external end of the piston, according to a pivot axis, which body comprises second stop means and is capable of occupying, with respect to the cylinder element and according to the pivot axis, a first angular position allowing an extraction/retraction of the piston with respect to the cylinder, as well as a second angular position allowed only when the piston occupies, with respect to the cylinder, an extracted position so that said second stop means are located beyond said first stop means in a direction of extraction of the piston with respect to the cylinder, and the body occupies said second position ensuring the positioning, in the direction of extraction, opposite the first and second stop means; and an electromagnetic attraction/repulsion device including a first element securely mounted on said cylinder as well as a second element securely mounted on said body, said electromagnetic attraction/repulsion device is designed to ensure the movement of the body from said first position to said second position, and vice versa, by attraction/repulsion of said first and second elements.

10. An aircraft including at least one hatch according to claim 1.

11. A hatch comprising:

at least one socket slidingly mounted and capable of occupying an extracted locking position as well as a retracted unlocking position, at least one flexible linear pulling member for said socket, a first member end of said pulling member being secured to said socket, said first member end being configured to move said socket from said extracted locking position to said retracted unlocking position when said first member end is urged in an unlocking direction, a first actuation means for moving said flexible linear pulling member in the unlocking direction, by abutting against a stop member secured to said flexible linear pulling member, at a distance from a second member end opposite said first member end, and said first actuation means being controllable from a first side of said hatch, a second actuation means for moving said flexible linear pulling member in the unlocking direction, wherein said second actuation means is connected to said second member end, and said second actuation means being controllable from a second side of said hatch, opposite said first side, wherein said second actuation means includes:

an actuation push button accessible from said second side of said hatch;

a connecting link pivotably connected at a first end of the connecting link to a pin of said actuation push button; and a sliding member pivotably connected at a first end of said sliding member to a second end of the connecting link, and connected at a second end of said sliding member to said flexible linear pulling member, wherein said second actuation means is designed so that a pressure on said push button causes a movement of said sliding member in said unlocking direction.

* * * * *